(12) United States Patent
Rao et al.

(10) Patent No.: US 11,978,334 B2
(45) Date of Patent: May 7, 2024

(54) VEHICULAR DIRECTIONAL ALERTING SYSTEM AND METHOD USING HAPTIC ALERTS AND OPTIONAL MULTI-MODAL ALERTS

(71) Applicant: Rockwell Collins, Inc., Cedar Rapids, IA (US)

(72) Inventors: Arjun Harsha Rao, Marion, IA (US); Timothy J. Wittkop, Marion, IA (US); Christopher L George, Winchester, VA (US); Michael P. Matessa, Ben Lomond, CA (US); Peggy Wu, Ellicott City, MD (US); Wade T. Johnson, Cedar Rapids, IA (US); Sarah Barber, Cedar Rapids, IA (US); Felix B. Turcios, Cedar Rapids, IA (US); Bryan C. Schultz, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 49 days.

(21) Appl. No.: 17/733,111

(22) Filed: Apr. 29, 2022

(65) Prior Publication Data

US 2022/0392319 A1 Dec. 8, 2022

Related U.S. Application Data

(60) Provisional application No. 63/196,982, filed on Jun. 4, 2021.

(51) Int. Cl.
*H04B 3/36* (2006.01)
*G02B 27/00* (2006.01)
(Continued)

(52) U.S. Cl.
CPC ........... *G08B 6/00* (2013.01); *G02B 27/0093* (2013.01); *G02B 27/0101* (2013.01);
(Continued)

(58) Field of Classification Search
CPC .. G08B 6/00; G02B 27/0093; G02B 27/0101; G02B 27/017; G02B 27/0179;
(Continued)

(56) References Cited

U.S. PATENT DOCUMENTS 9,248,904 B2 * 2/2016 Nouvel .............. B64D 11/0689
9,421,908 B2 * 8/2016 McQueen ................ B06B 1/16
(Continued)

FOREIGN PATENT DOCUMENTS

DE 102017218569 A1 * 4/2019 .............. G05G 5/03
EP 3561793 A1 10/2019
WO WO-2017177122 A1 * 10/2017 ........... G02B 17/086

OTHER PUBLICATIONS

GM TechLink. "Vibrations or Beep?—Active Safety Seat Operation", Jul. 22, 2017, 5 pages, Retrieved From < https://gm-techlink.com/?p=8091>.

(Continued)

*Primary Examiner* — Toan N Pham
(74) *Attorney, Agent, or Firm* — Suiter Swantz IP

(57) ABSTRACT

A system may include a vehicle. The vehicle may include an array of haptic devices. The system may further include at least one processor configured to: determine a location of an object or occurrence relative to the user; based at least on the location of the object or occurrence relative to the user, select at least one haptic device of the array of haptic devices to be driven and function as a directional haptic alert to the user, wherein the directional haptic alert is indicative of a direction from the user toward the object or occurrence; and output at least one command to cause a driving of the selected at least one haptic device, wherein the driving of the selected at least one haptic device is perceivable by the user as the directional haptic alert.

20 Claims, 20 Drawing Sheets

(51) Int. Cl.
    *G02B 27/01*       (2006.01)
    *G08B 6/00*        (2006.01)
    *G08G 5/00*        (2006.01)
    *G08G 5/04*        (2006.01)

(52) U.S. Cl.
    CPC ....... *G02B 27/017* (2013.01); *G02B 27/0179* (2013.01); *G08G 5/0021* (2013.01); *G08G 5/0078* (2013.01); *G08G 5/0091* (2013.01); *G08G 5/045* (2013.01); *G02B 2027/014* (2013.01); *G02B 2027/0187* (2013.01)

(58) Field of Classification Search
    CPC ...... G02B 2027/014; G02B 2027/0187; G08G 5/0021; G08G 5/0078; G08G 5/0091; G08G 5/045; G08G 5/0008; G08G 5/0052; B60W 50/16; G06F 3/012; G06F 3/016; A42B 3/046; B64C 13/10; B64D 10/00; B64D 11/0689; B64D 45/00; B64D 43/00

See application file for complete search history.

(56) References Cited

U.S. PATENT DOCUMENTS

| | | | |
|---|---|---|---|
| 9,573,522 B2 | 2/2017 | James | |
| 10,661,682 B2 | 5/2020 | Alequin | |
| 10,940,872 B2 | 3/2021 | Alexiou et al. | |
| 11,019,450 B2 | 5/2021 | Stanek et al. | |
| 2007/0109104 A1* | 5/2007 | Altan | B60Q 9/008 340/407.1 |
| 2011/0018740 A1 | 1/2011 | Boren et al. | |
| 2013/0249262 A1* | 9/2013 | Herman | G08B 6/00 340/963 |
| 2016/0009411 A1 | 1/2016 | Davalos et al. | |
| 2016/0107570 A1* | 4/2016 | Modarres | B62D 15/029 340/435 |
| 2017/0270808 A1 | 9/2017 | Onomura et al. | |
| 2019/0300020 A1 | 10/2019 | Alexiou et al. | |
| 2019/0337451 A1* | 11/2019 | Bacchus | B60Q 9/008 |
| 2019/0366190 A1 | 12/2019 | Giampietro et al. | |
| 2020/0156539 A1 | 5/2020 | Yamamoto et al. | |
| 2020/0377015 A1 | 12/2020 | Yamamoto et al. | |
| 2021/0097873 A1 | 4/2021 | Sassinsky | |

OTHER PUBLICATIONS

Niermann, Christian. (2018). 3D Audio Support for Helicopter Pilots During Confined Area Landings.
Extended Search Report in European Application No. 22176974.8 dated Oct. 17, 2022, 7 pages.

* cited by examiner

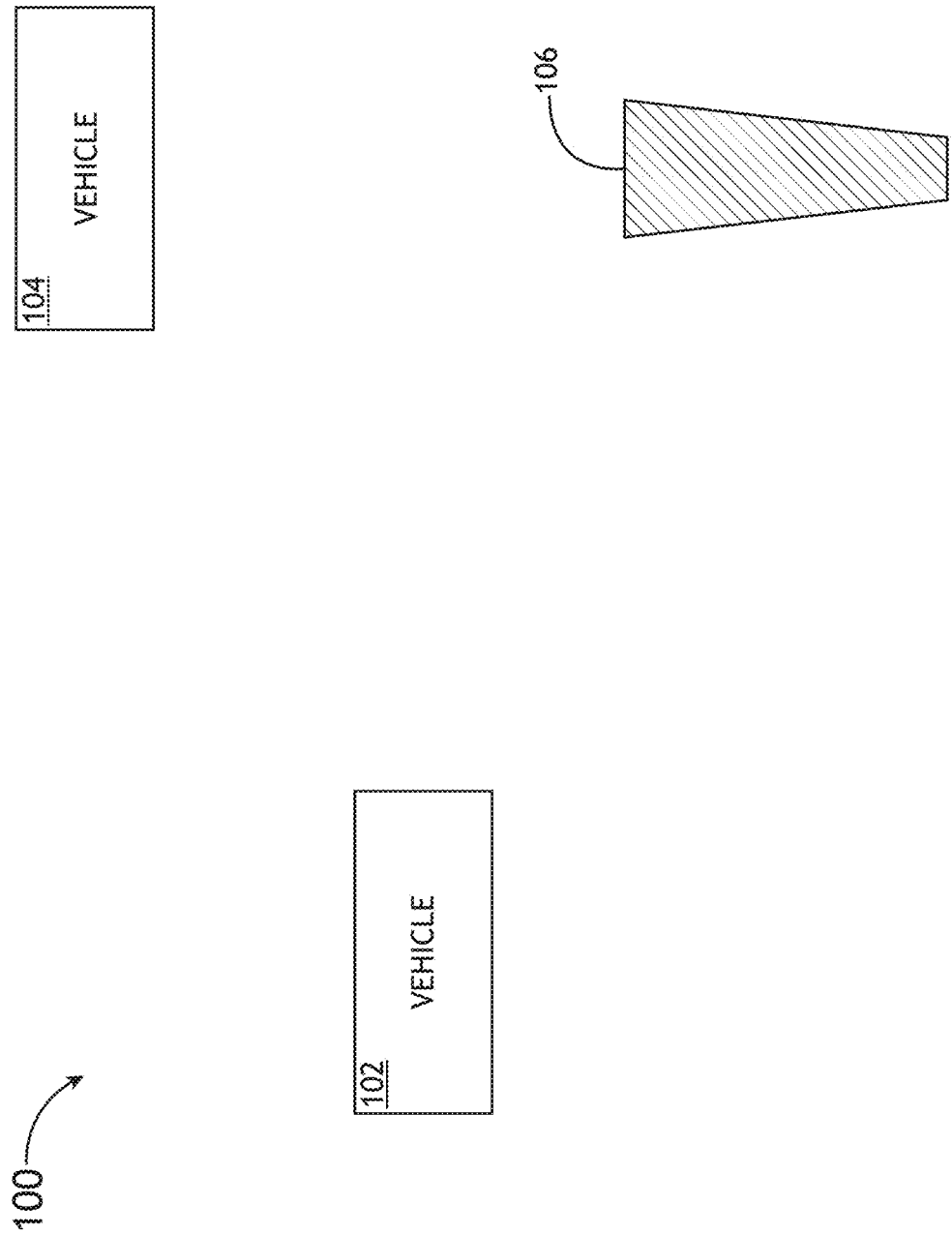

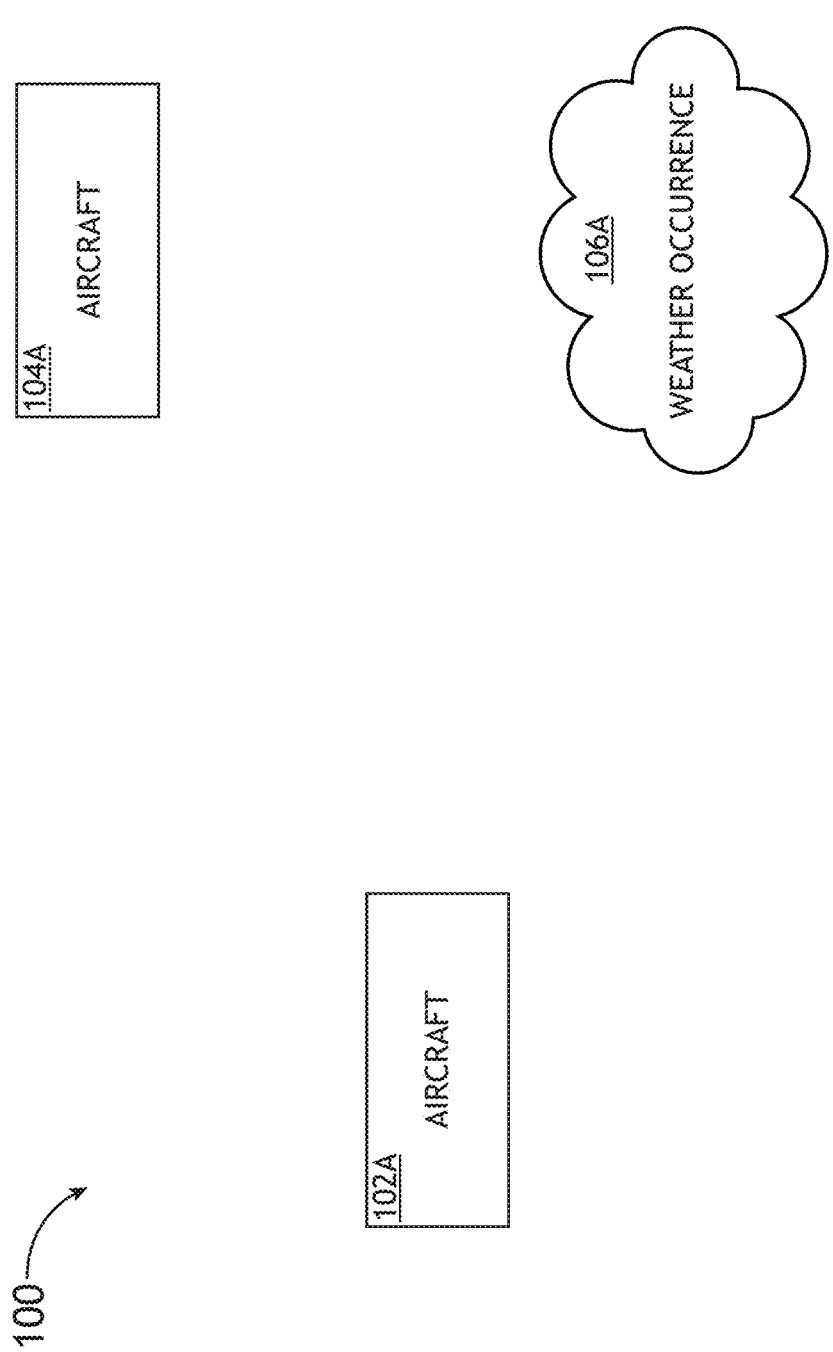

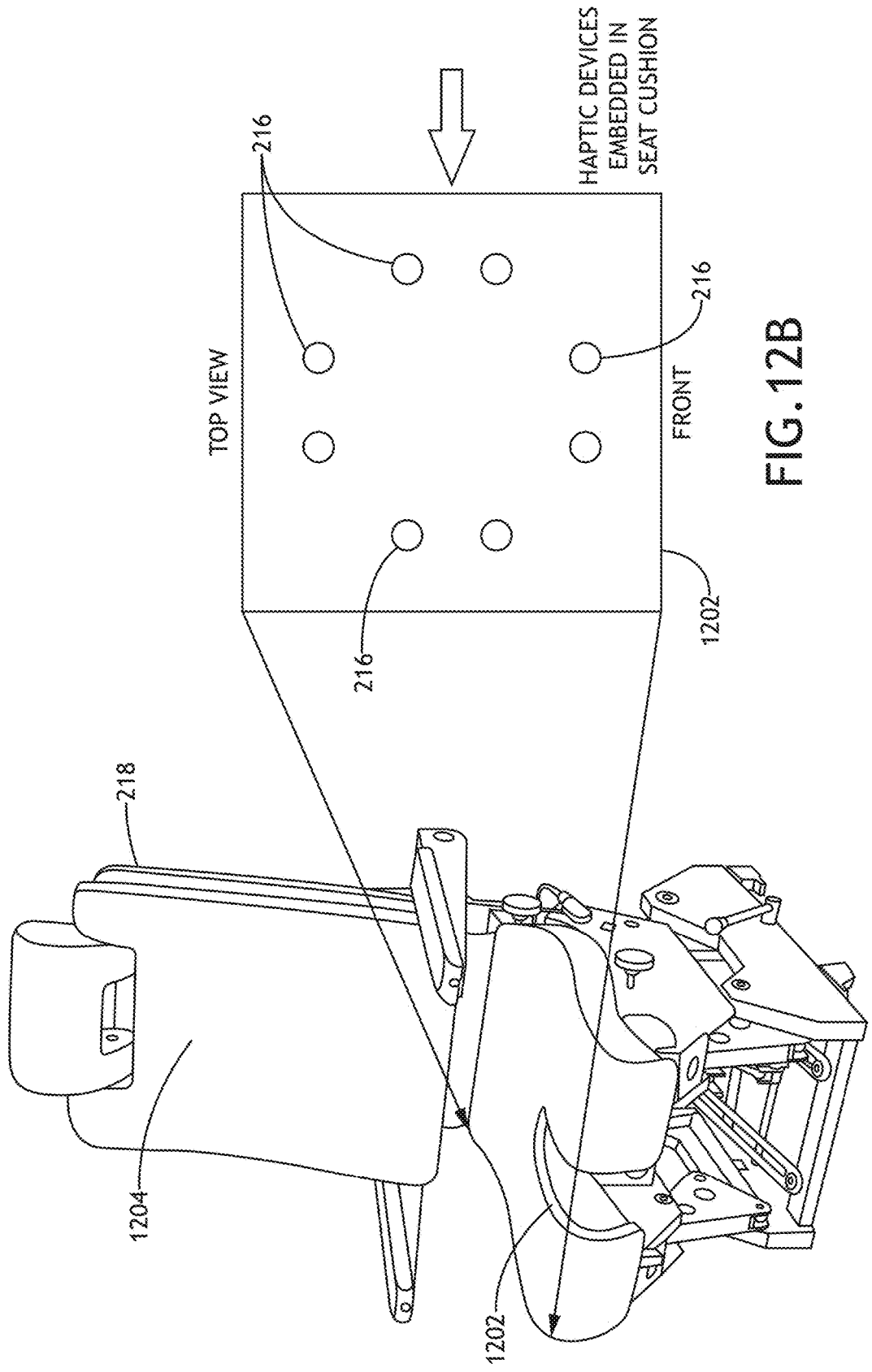

1400

1402 — DETERMINING, BY AT LEAST ONE PROCESSOR OF A VEHICLE, A LOCATION OF AN OBJECT OR OCCURRENCE RELATIVE TO AN ARRAY OF HAPTIC DEVICES, THE VEHICLE INCLUDING THE AT LEAST ONE PROCESSOR AND THE ARRAY OF HAPTIC DEVICES, WHEREIN A DRIVING OF ONE OR MORE HAPTIC DEVICES OF THE ARRAY OF HAPTIC DEVICES IS PERCEIVABLE BY A USER AS AT LEAST ONE OF A TACTILE OR A VIBRATORY SENSATION, THE AT LEAST ONE PROCESSOR COMMUNICATIVELY COUPLED TO THE ARRAY OF HAPTIC DEVICES

1404 — BASED AT LEAST ON THE LOCATION OF THE OBJECT OR OCCURRENCE RELATIVE TO THE ARRAY OF HAPTIC DEVICES, SELECTING, BY THE AT LEAST ONE PROCESSOR, AT LEAST ONE HAPTIC DEVICE OF THE ARRAY OF HAPTIC DEVICES TO BE DRIVEN AND FUNCTION AS A DIRECTIONAL HAPTIC ALERT TO THE USER, WHEREIN THE DIRECTIONAL HAPTIC ALERT IS INDICATIVE OF A DIRECTION FROM THE SELECTED AT LEAST ONE HAPTIC DEVICE TOWARD THE OBJECT OR OCCURRENCE

1406 — OUTPUTTING, BY THE AT LEAST ONE PROCESSOR, AT LEAST ONE COMMAND TO CAUSE A DRIVING OF THE SELECTED AT LEAST ONE HAPTIC DEVICE, WHEREIN THE DRIVING OF THE SELECTED AT LEAST ONE HAPTIC DEVICE IS PERCEIVABLE BY THE USER AS THE DIRECTIONAL HAPTIC ALERT

FIG.14

VEHICULAR DIRECTIONAL ALERTING SYSTEM AND METHOD USING HAPTIC ALERTS AND OPTIONAL MULTI-MODAL ALERTS

CROSS-REFERENCE TO RELATED APPLICATIONS

The present application is related to and claims priority from: U.S. Application Ser. No. 63/196,982, titled VEHICULAR DIRECTIONAL ALERTING SYSTEM USING HAPTIC ALERTS AND OPTIONAL MULTI-MODAL ALERTS, filed Jun. 4, 2021. U.S. Application Ser. No. 63/196,982 is herein incorporated by reference in its entirety.

BACKGROUND

Currently, alerting in the flight deck is limited to visual cues on a display and audio tones. At times, such cues are overused and can lead to pilots tuning out the alerts.

SUMMARY

In one aspect, embodiments of the inventive concepts disclosed herein are directed to a system. The system may include a vehicle. The vehicle may include an array of haptic devices, wherein a driving of one or more haptic devices of the array of haptic devices is perceivable by a user as at least one of a tactile or a vibratory sensation. The system may further include at least one processor communicatively coupled to the array of haptic devices. The at least one processor may be configured to: determine a location of an object or occurrence relative to the user; based at least on the location of the object or occurrence relative to the user, select at least one haptic device of the array of haptic devices to be driven and function as a directional haptic alert to the user, wherein the directional haptic alert is indicative of a direction from the user toward the object or occurrence; and output at least one command to cause a driving of the selected at least one haptic device, wherein the driving of the selected at least one haptic device is perceivable by the user as the directional haptic alert.

In a further aspect, embodiments of the inventive concepts disclosed herein are directed to a method. The method may include: determining, by at least one processor of a vehicle, a location of an object or occurrence relative to a user, the vehicle including the at least one processor and an array of haptic devices, wherein a driving of one or more haptic devices of the array of haptic devices is perceivable by the user as at least one of a tactile or a vibratory sensation, the at least one processor communicatively coupled to the array of haptic devices; based at least on the location of the object or occurrence relative to the user, selecting, by the at least one processor, at least one haptic device of the array of haptic devices to be driven and function as a directional haptic alert to the user, wherein the directional haptic alert is indicative of a direction from the user toward the object or occurrence; and outputting, by the at least one processor, at least one command to cause a driving of the selected at least one haptic device, wherein the driving of the selected at least one haptic device is perceivable by the user as the directional haptic alert.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 1A is a view of an exemplary embodiment of a system including a vehicle, an object, and an occurrence according to the inventive concepts disclosed herein.

FIG. 1B is a view of an exemplary embodiment of the system of FIG. 1 including an aircraft, an object, and an occurrence according to the inventive concepts disclosed herein.

FIGS. 12A and 12B are views of an exemplary seat including haptic devices of FIG. 2 according to the inventive concepts disclosed herein.

FIG. 14 is a diagram of an exemplary embodiment of a method according to the inventive concepts disclosed herein.

DETAILED DESCRIPTION

Figure 2:
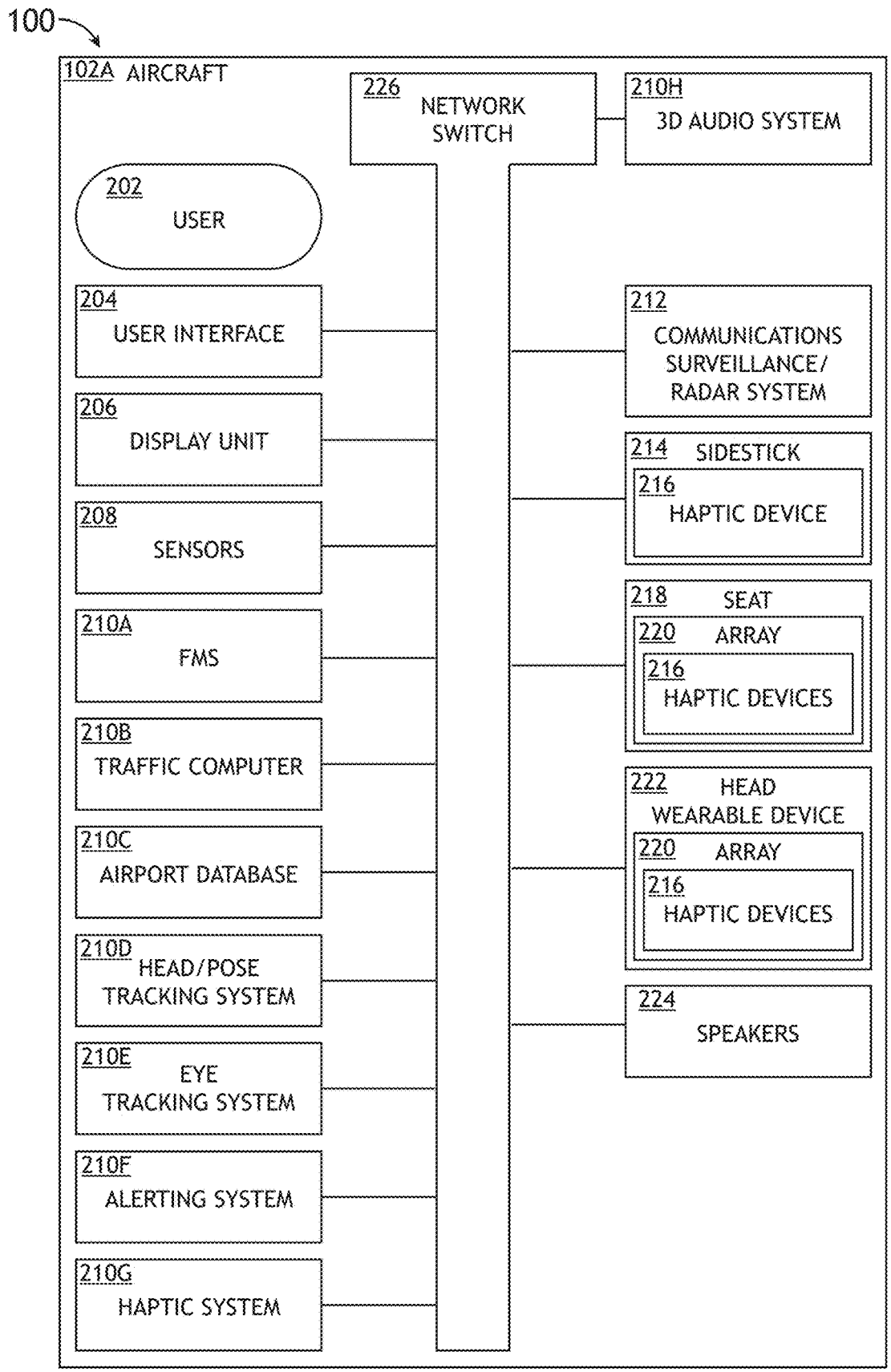
FIG. 2 is a view of an exemplary embodiment of the aircraft of FIG. 1B according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a method and a system (e.g., a system including a vehicle (e.g., an aircraft)) including an array of haptic devices and at least one processor, wherein the system may be configured to output at least one command to cause a driving of a selected portion of the array of haptic devices, wherein the driving of the selected portion is perceivable by the user as a directional haptic alert associated with a location of an object or occurrence relative to the user and/or the selected portion of the array of haptic devices. In some embodiments, the system may be configured to present, to the user, multi-modal alerts (e.g., haptic alerts, three-dimensional (3D) alerts, and/or graphic alerts) associated with the location of the object or occurrence relative to the user and/or the selected portion of the array of haptic devices.

Some embodiments may include a multi-modal alerting system that may utilize 3D audio alerts (e.g., 3D directional audio alerts) and haptic alerts (e.g., directional haptic alerts) which may increase a pilot's situational awareness of a direction and severity of alerts within a cockpit. Haptic devices (e.g., ultrasonic transducers and/or motorized vibrotactile devices having motors) can be arranged in an array and installed inside and/or on a seat (e.g., a seat bottom cushion and/or a seat back) and/or in and/or on a pilot's head wearable device (e.g., a helmet and/or a headset). For example, when an alert has a directionality associated with an object or occurrence, the system may cause a portion of the haptic devices to vibrate or induce a vibratory sensation, to the pilot, to indicate a direction (e.g., a direction of oncoming traffic) of the object or occurrence, which may be dangerous or threatening. For example, the haptic device arrangement in the seat could be used to vibrate or induce a vibratory sensation by the haptic device closest to the alert. For example, the haptic devices in a seat could be arranged in a circular pattern or pattern around edges of a seat bottom cushion and the system could vibrate the haptic device closest to the alert. For example, haptic devices could also be placed on the left and right side of a pilot's headset. Some embodiments may include the use of pilot head tracking, such as by using head tracking systems, pose tracking systems, and/or eye tracking systems, and/or inertial measurement units (IMUs) to facilitate directional alerting. For example, as a orientation of the pilot's head relative to the ownship changes, actively driven haptic devices could change such that, at any given time, the actively driven haptic devices provide directionality that maintains alignment with the associated object or occurrence. Additionally, for example, an intensity, pulse pattern, frequency, and/or quantity of active haptic devices vibrating or inducing a vibratory sensation may be based on a priority level associated with the directional haptic alert. For example, the priority level may be associated with a determined severity and/or proximity of the object or occurrence associated with the alert.

Some embodiments may increase situational awareness and directionality for alerts. The alerts may be non-intrusive and/or non-invasive. In some embodiments, the directional haptic alerts may be considered as a secondary alert to other primary alerts; however, such supplemental directional haptic alerts may increase an effectiveness of alerting systems.

Referring now to FIGS. 1A, 1B, 2, 3, 4, 5, 6, 7, 8, 9A, 9B, 10, 11A, 11B, 11C, 11D, 12A, 12B, 13A, 13B, 13C, 13D, and 15, exemplary embodiments of a system 100 according to the inventive concepts disclosed herein is depicted. As shown in FIGS. 1A and 1B, in some embodiments, the system 100 may include a vehicle 102 (e.g., aircraft 102A (e.g., which may be an ownship)). The system 100 may also include at least one object (e.g., at least one vehicle 104 (e.g., an aircraft 104A)) or at least one occurrence (e.g., weather occurrence 106, 106A). For example, where the object or occurrence is an object, the object may be any object or portion of an object that presents a threat, danger, risk, hazard, or alertable event to the vehicle 102 (e.g., the aircraft 102A); exemplary objects may include: another vehicle 104 (e.g., the aircraft 104A), an edge of a surface (e.g., a road surface or a runway surface) the vehicle 102 (e.g., the aircraft 102A) is traversing, a building or a portion of a building, an intersection (e.g., a road intersection or a runway intersection), a portion of an airport surface, an obstruction, a munition or fired weapon, and/or an animal (e.g., a human, a deer, or a bird). For example, where the object or occurrence is an occurrence, the occurrence may be any occurrence that presents a threat, danger, risk, hazard, or alertable event to the vehicle 102 (e.g., the aircraft 102A); exemplary occurrences may include: weather occurrences (e.g., a storm, turbulence, lightning, flood, degraded visual environment, fog, wind, rain, hail, tornado, ice, and/or hurricane), a predetermined distance away from a flight plan, and/or restricted airspace. In some embodiments, the system 100 may include an air traffic control (ATC) (not shown). In some embodiments, some or all of the vehicle 102 (e.g., the aircraft 102A), the vehicle 104 (e.g., aircraft 104A), and/or the ATC may be communicatively coupled at any given time For example, as shown in FIGS. 2, 3, 4, 5, 6, 7, 8, 9A, 9B, 10, 11A, 11B, 11C, 11D, 12A, 12B, 13A, 13B, 13C, 13D, and 15, the aircraft 102A of FIG. 1B may include at least one user 202, at least one user interface 204, at least one display unit computing device 206, sensors 208, at least one computing device 210A (e.g., at least one flight management system (FMS) computing device), at least one computing device 210B (e.g., at least one traffic computer), at least one computing device 210C (e.g., at least one airport database computing device), at least one computing device 210D (e.g., at least one head and/or pose tracking system computing device), at least one computing device 210E (e.g., at least one eye tracking system computing device), at least one computing device 210F (e.g., at least one alerting system computing device), at least one computing device 210G (e.g., at least one haptic system computing device), at least one computing device 210H (e.g., at least one three-dimensional (3D) audio system computing device), communications and/or surveillance and/or radar systems 212, at least one sidestick 214 (e.g., at least one active sidestick), at least one seat 218, at least one head wearable device 222 (e.g., at least one headset 222A and/or at least one helmet 222B), speakers 224, at least one array 220 of haptic devices 216, at least one haptic device 216, and/or a data network switch 226, some or all of which may be communicatively coupled at any given time, such as via the data network switch 226. In some embodiments, the at least one user interface 204, the at least one display unit computing device 206, the at least one computing device 210A, 210B, 210C, 210D, 210E, 210F, 210G, and/or 210H, the communications and/or surveillance and/or radar systems 212, the at least one head wearable device 222, and/or the data network switch 226 may be implemented as a single computing device or any number of computing devices configured to perform any or all of the operations disclosed throughout. In some embodiments, some or all of the at least one user 202, the at least one user interface 204, the at least one display unit computing device 206, the at least one computing device 210A, 210B, 210C, 210D, 210E, 210F, 210G, and/or 210H, the communications and/or surveillance and/or radar systems 212, the at least one head wearable device 222, and/or the data network switch 226 may be implemented onboard the aircraft 102A. In some embodiments, the at least one user 202 (e.g., a remote pilot or remote crewmember), the at least one user interface 204, the at least one display unit computing device 206, the at least one computing device 210A, 210B, 210C, 210D, 210E, 210F, 210G, and/or 210H, the communications and/or surveillance and/or radar systems 212, the at least one head wearable device 222, and/or the data network switch 226 may be implemented offboard of the aircraft 102, for example, if a given aircraft 102A is a remote piloted aircraft (e.g., an unmanned aerial vehicle (UAV) or a drone aircraft). While FIGS. 2, 3, 4, 5, 6, 7, 8, 9A, 9B, 10, 11A, 11B, 11C, 11D, 12A, 12B, 13A, 13B, 13C, 13D, and 15 show and describe exemplary embodiments including the aircraft 102A, other embodiments may be adapted for other vehicles types or for use without a vehicle, as would be appreciated by one skilled in the art.

Figure 9A:
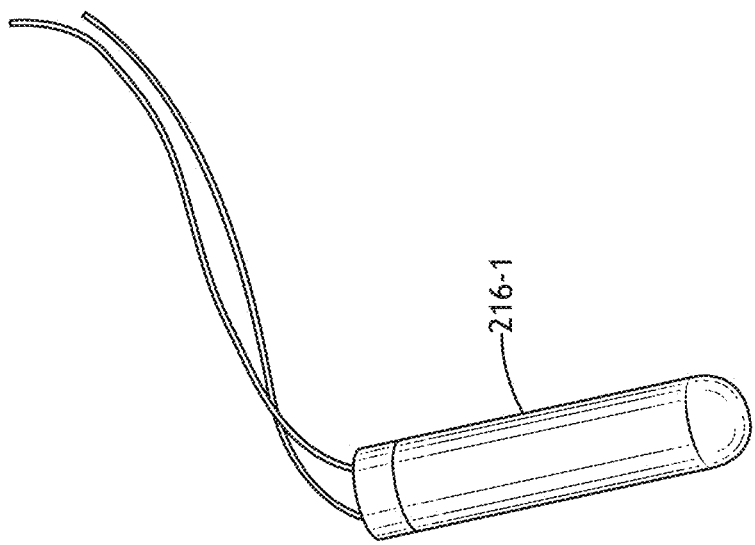
FIG. 9A is a view of an exemplary haptic device of FIG. 2 according to the inventive concepts disclosed herein.
Figure 9B:
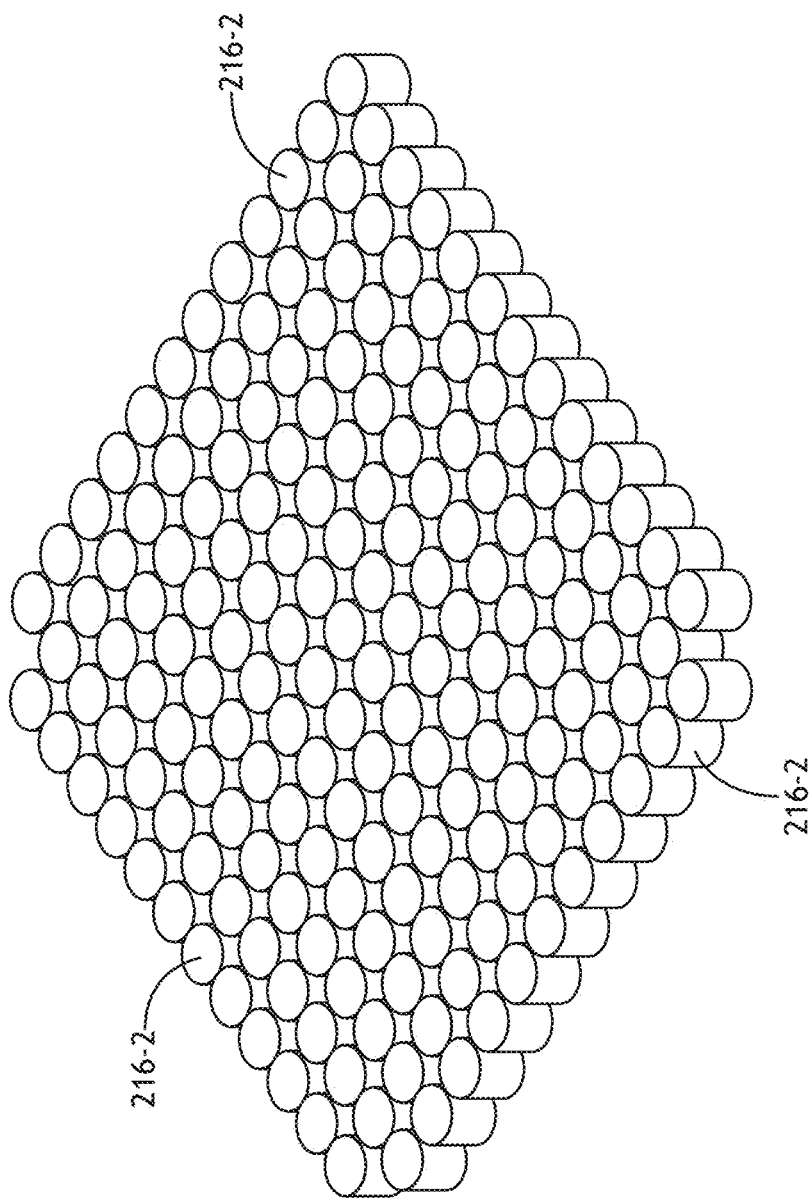
FIG. 9B is a view of further exemplary haptic devices of FIG. 2 according to the inventive concepts disclosed herein.

Each of the haptic devices 216 may be any suitable device such that a driving (e.g., an electrical driving) of the haptic device 216 is perceivable by the user 202 as at least one of a tactile or a vibratory sensation. For example, some or all of the haptic devices 216 may be motorized vibrotactile devices 216-1 (as shown in FIG. 9A), each including a motor, wherein driving the motor causes a motorized vibrotactile device 216-1 to vibrate. For example, some or all of the haptic devices 216 may be ultrasonic transducers 216-2 (as shown in FIG. 9B), wherein driving an ultrasonic transducer 216-2 is perceivable by the user 202 a tactile and/or a vibratory sensation. For example, each ultrasonic transducer 216-2 may produce an ultrasonic acoustic field that is perceivable by the user 202 a tactile and/or a vibratory sensation.

In some embodiments, the aircraft 102A may include at least one array 220 of haptic devices 216 that may be installed in or on the seat 218 and/or the head wearable device 222. In some embodiments, at least one haptic device 216 and/or at least one array 220 of haptic devices 216 may be installed in or on the sidestick 214. In some embodiments, the at least one haptic device 216 and/or at least one array 220 of haptic devices 216 may be installed at any suitable location onboard and/or offboard the aircraft 102A. For example, at least one processor of at least one computing device 206, 210A, 210B, 210C, 210D, 210E, 210F, 210G, and/or 210H may be configured to output at least one command to cause a driving of a selected portion of an array 220 of haptic devices 216, wherein the driving of the selected portion is perceivable by the user 202 as a directional haptic alert associated with a location of an object or occurrence relative to the user and/or the array 220 of haptic devices 216.

Figure 10:
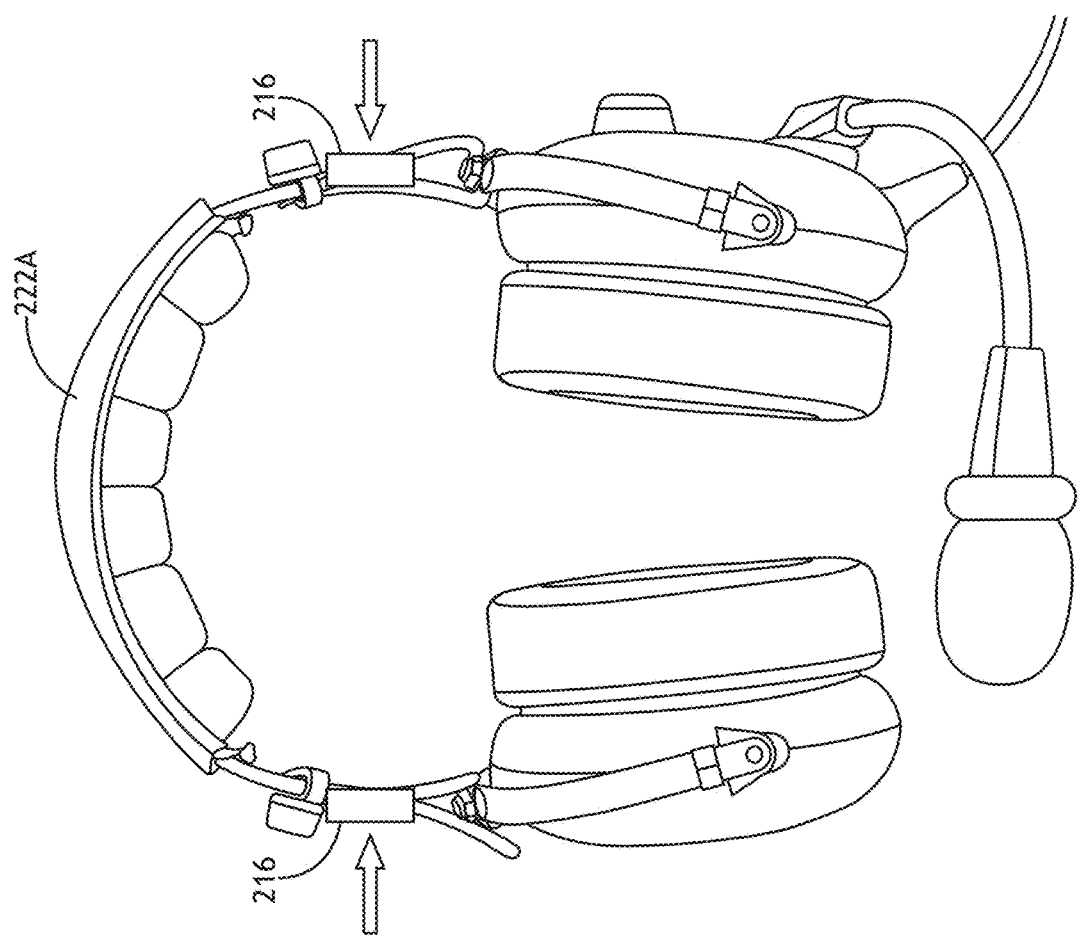
FIG. 10 is a view of an exemplary head wearable device including haptic devices of FIG. 2 according to the inventive concepts disclosed herein.
Figure 11A:
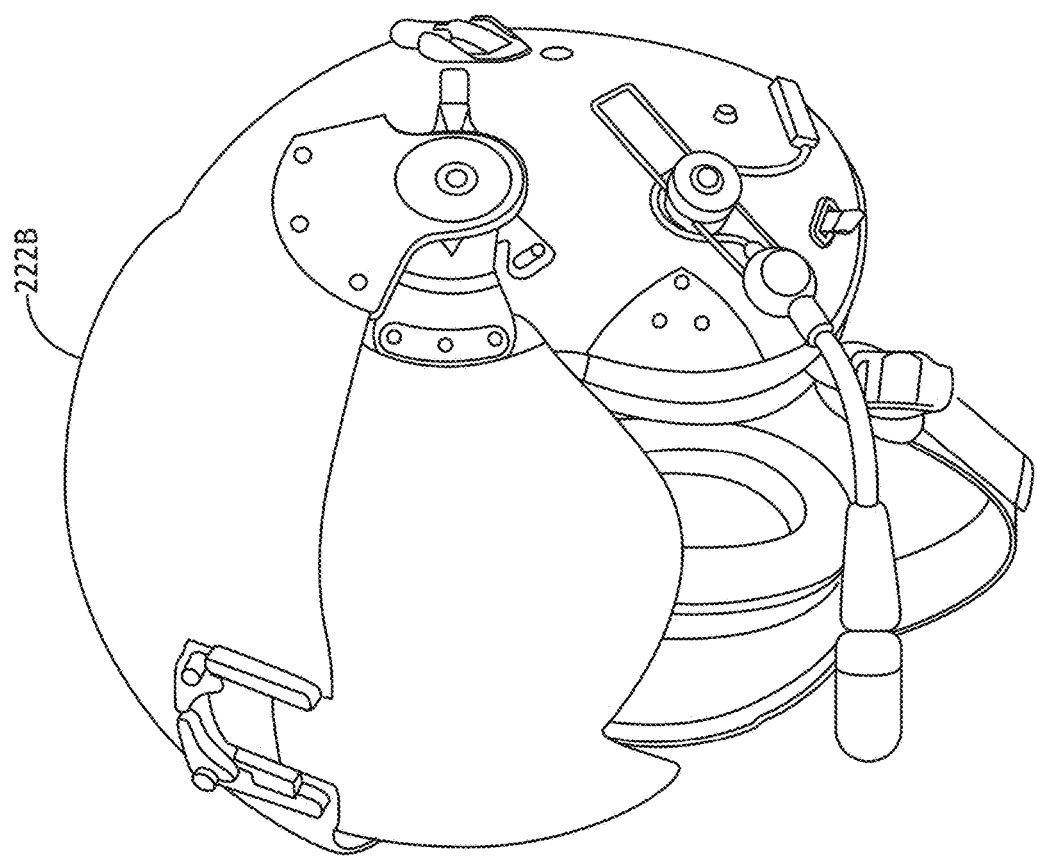
FIGS. 11A, 11B, 11C, and 11D are views of a further exemplary head wearable device including haptic devices of FIG. 2 according to the inventive concepts disclosed herein.
Figure 11B:
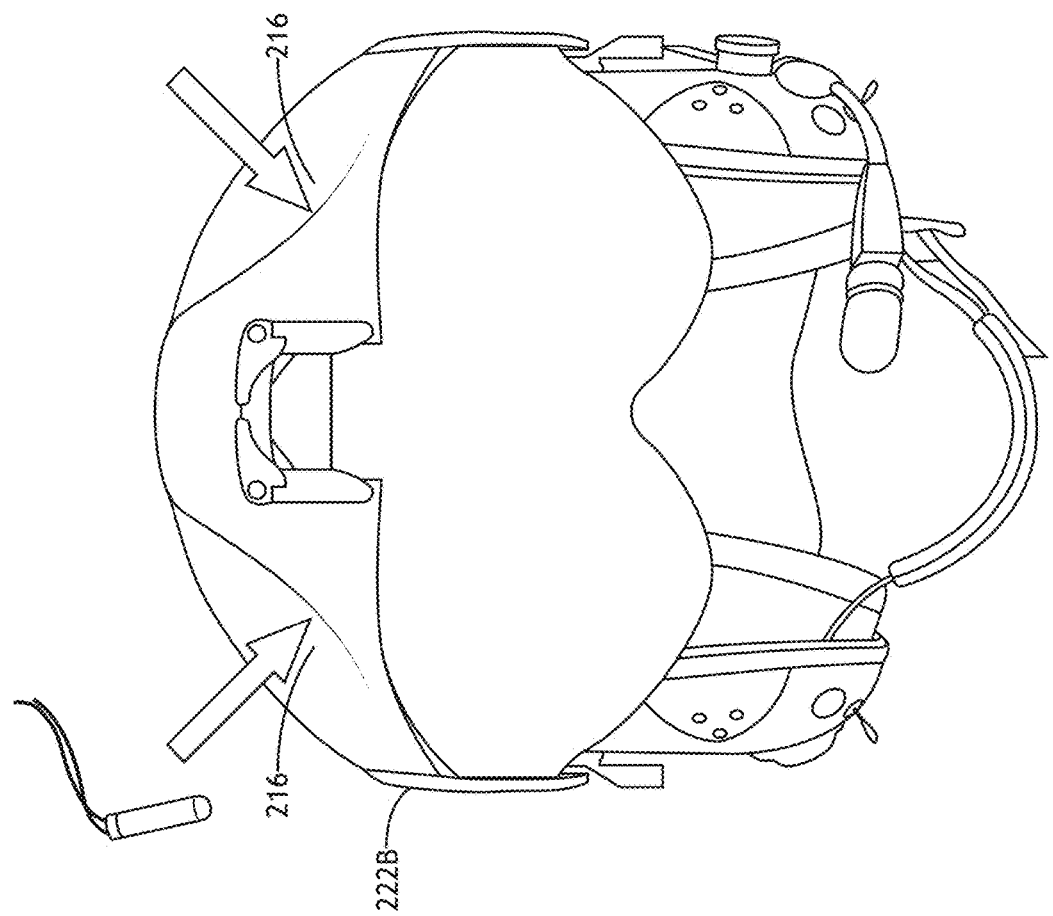
Figures 11C, 11D:
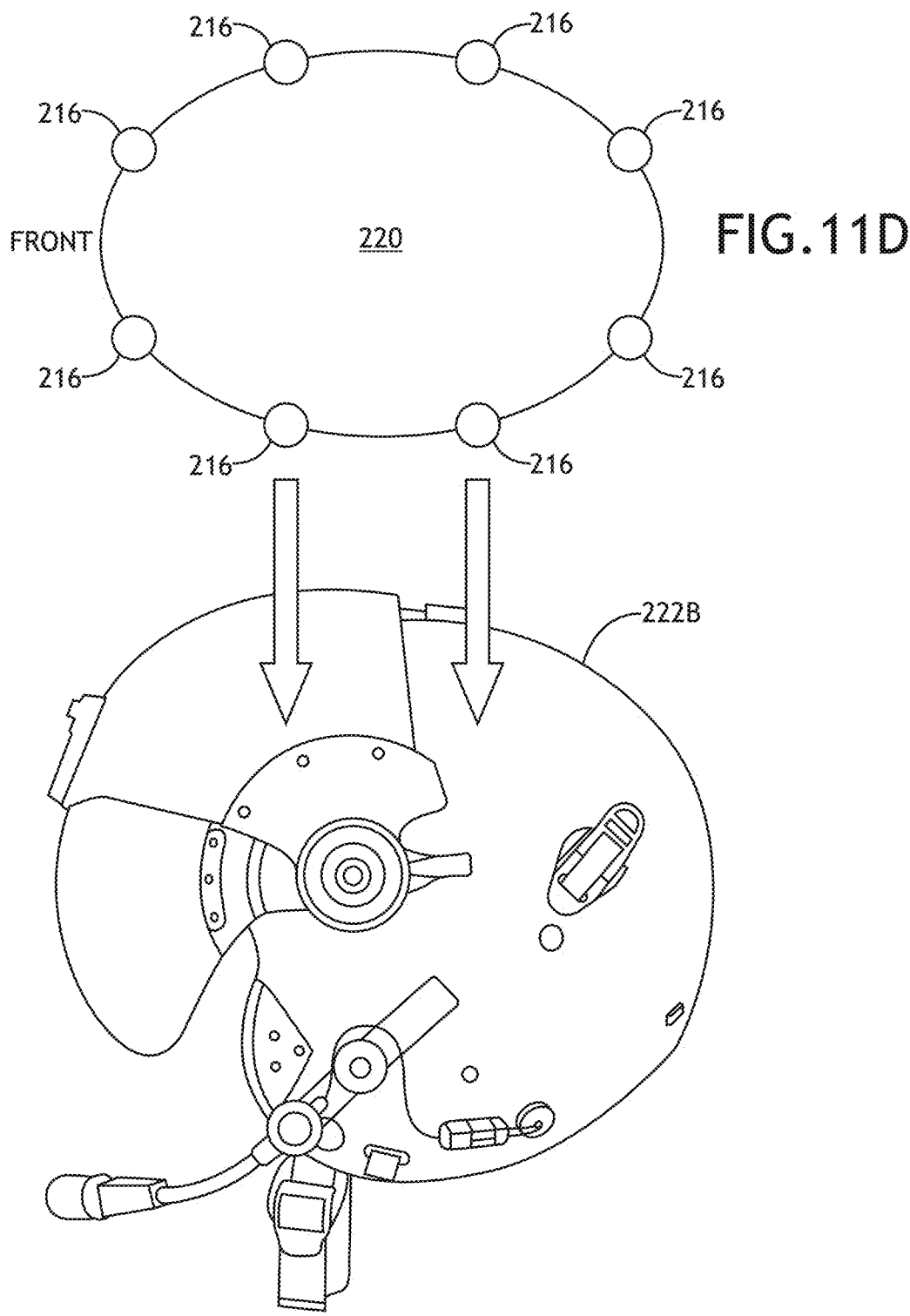
Figure 13A:
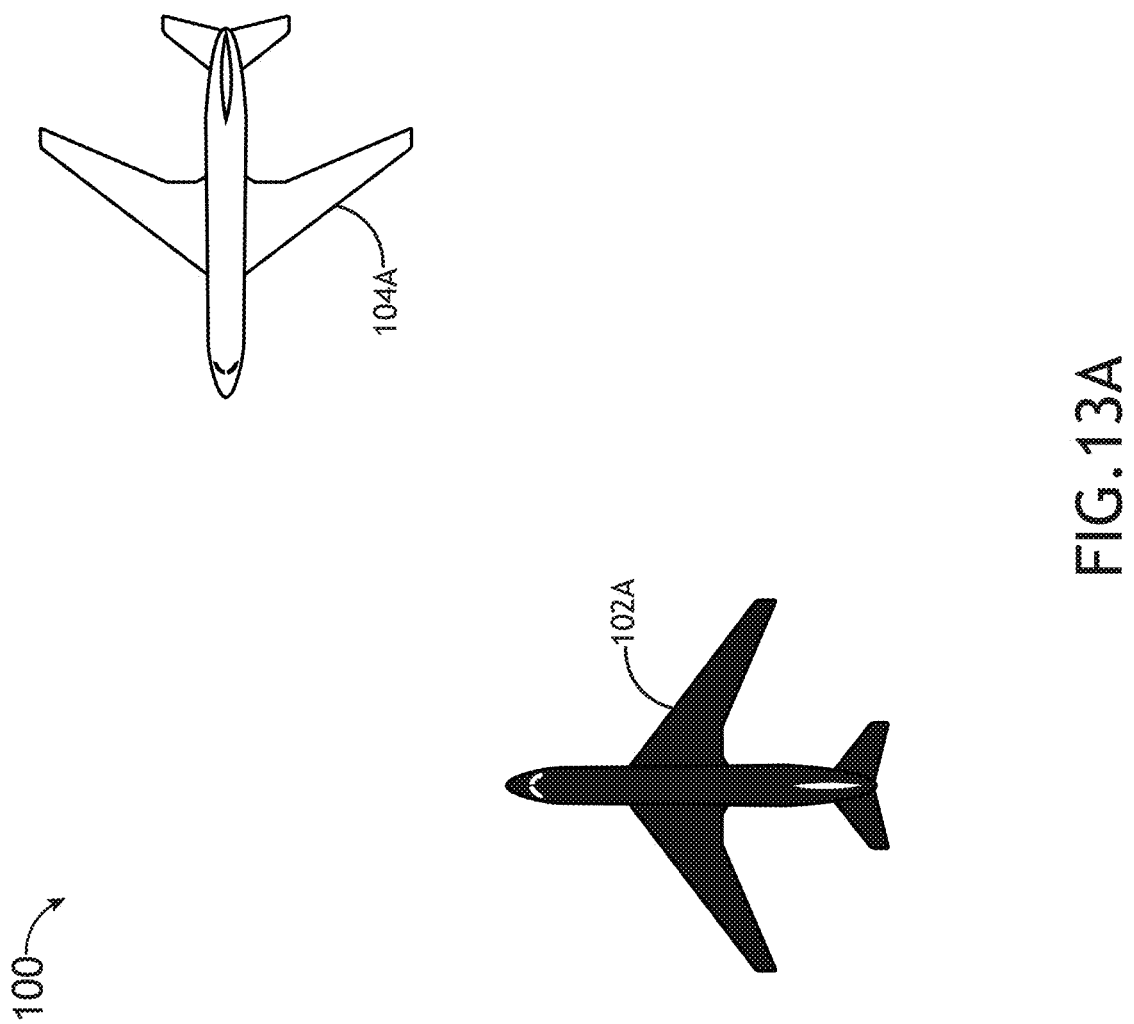
FIGS. 13A, 13B, 13C, and 13D are views of the system of FIG. 1 and two exemplary arrays of haptic devices of FIG. 2, wherein actively driven haptic devices of one of the two arrays changes at different times, according to the inventive concepts disclosed herein.
Figures 13B, 13C, 13D:
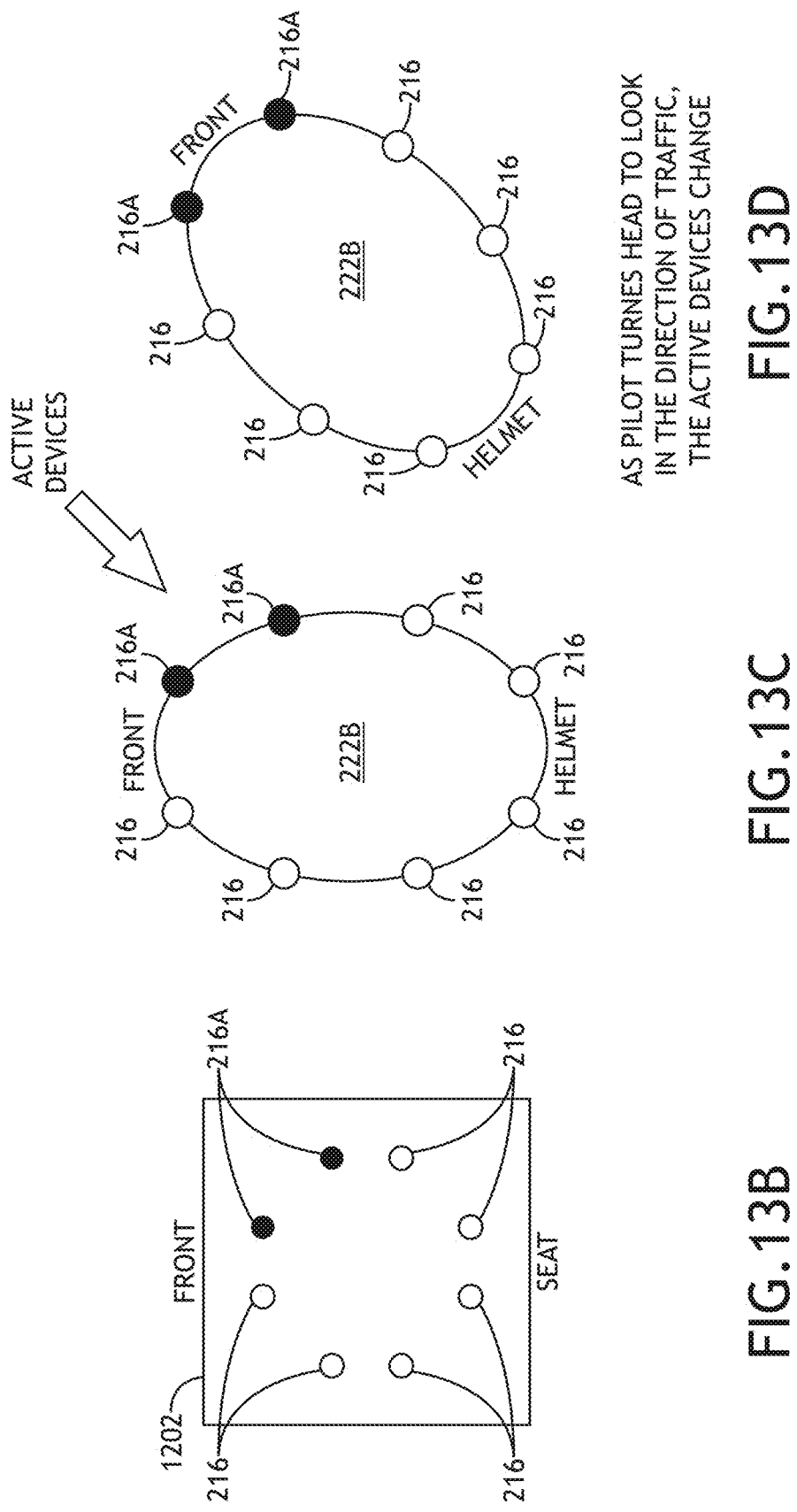
Figure 15:
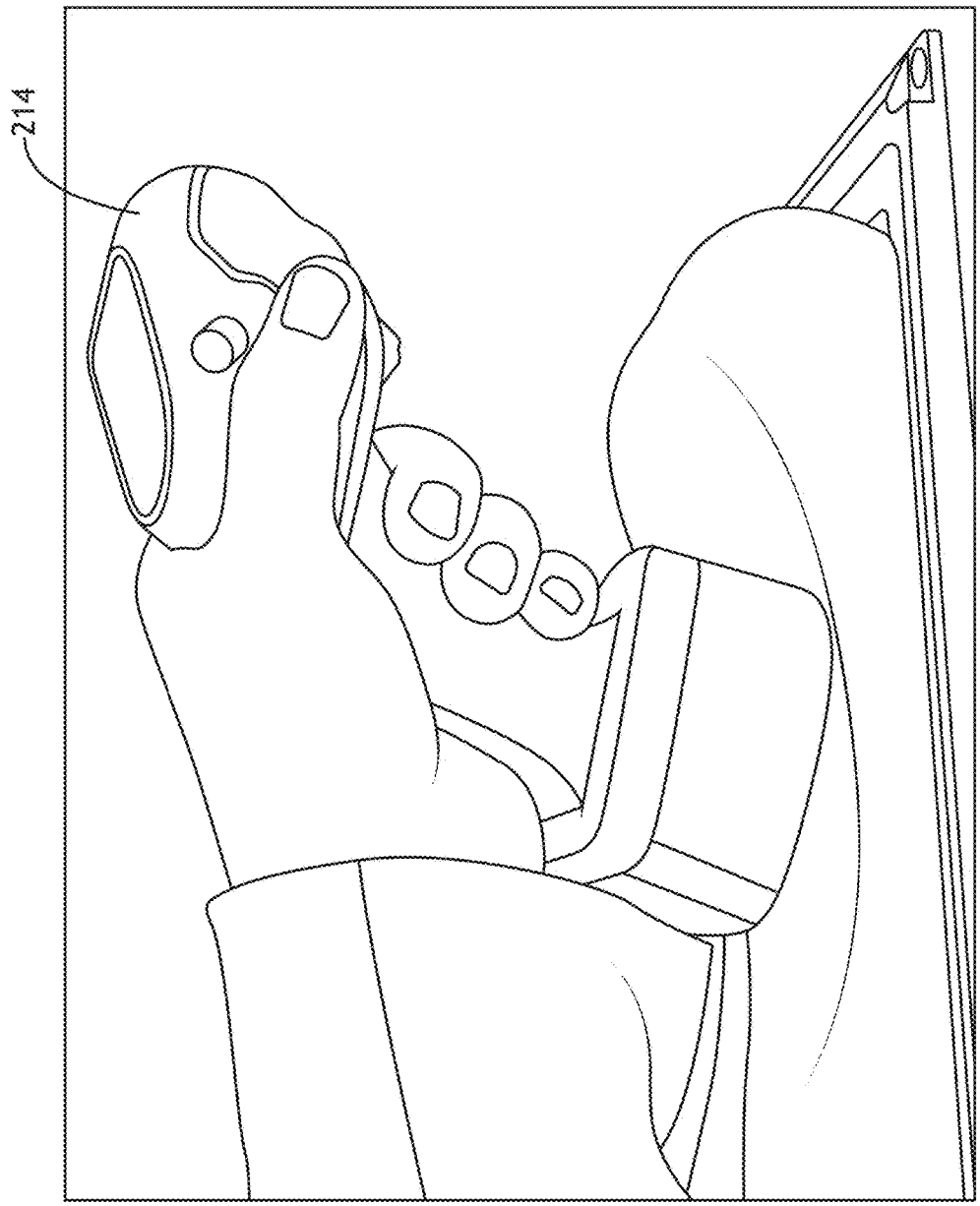
FIG. 15 is a view of an exemplary sidestick including a haptic device of FIG. 2 according to the inventive concepts disclosed herein.

For example, as shown in FIG. 10, the headset 222A may include an array 220 of haptic devices 216 installed in or on the headset 222A such that at least one first haptic device 216 is located on a first side (e.g., a left side) of the headset 222A and at least one second haptic device 216 is located on a second side (e.g., a right side) of the headset 222A.

For example, as shown in FIGS. 11A, 11B, 11C, and 11D, the helmet 222B may include an array 220 of haptic devices 216 installed in or on the helmet 222B. For example, the array 220 may include any suitable number of haptic devices 216 at any suitable positions. For example, the array 220 may include two haptic devices 216 located at a front of the helmet 222B, two haptic devices 216 located at a first side (e.g., a left side) of the helmet 222B, two haptic devices 216 located at a second side (e.g., a right side) of the helmet 222B, and two haptic devices 216 located at a rear of the helmet 222B. Additionally, for example, the array 220 may include at least one haptic device 216 on at top of the helmet 222B and at least one haptic device 216 on a chin strap of the helmet 222B.

For example, as shown in FIGS. 12A and 12B, the seat 218 may include at least one array 220 of haptic devices 216 installed in or on the seat 218. For example, a seat bottom cushion 1202 may include at least one array 220 of haptic devices 216 installed in or on the seat bottom cushion 1202. For example, a seat back cushion 1204 may include at least one array 220 of haptic devices 216 installed in or on the seat back cushion 1204. For example, the array 220 may include two haptic devices 216 located at a front of the seat bottom cushion 1202, two haptic devices 216 located at a first side (e.g., a left side) of the seat bottom cushion 1202, two haptic devices 216 located at a second side (e.g., a right side) of the seat bottom cushion 1202, and two haptic devices 216 located at a rear of the seat bottom cushion 1202.

The user 202 may be a pilot, a remote pilot, a crew member, or a remote crew member. The user 202 may be configured to interface with the system via the user interface 204, the display unit computing device 206, sidestick 214, the speakers 224, the head wearable device 222, and/or the haptic devices 216. The at least one user interface 204 may be implemented as any suitable user interface, such as a touchscreen (e.g., of the display unit computing device 206 and/or another display unit), at least one head, gesture, and/or pose tracking system computing device (e.g., 210D), an eye tracking system 210E, a multipurpose control panel, a cursor control panel, a keyboard, a mouse, a trackpad, a button, a switch, and/or a voice recognition system. For example, the user interface 204 may be configured to output content (e.g., graphical content, audible content, and/or haptic content), receive a user selection, and to output the user selection to a computing device (e.g., the display unit computing device 206).

Figure 3:
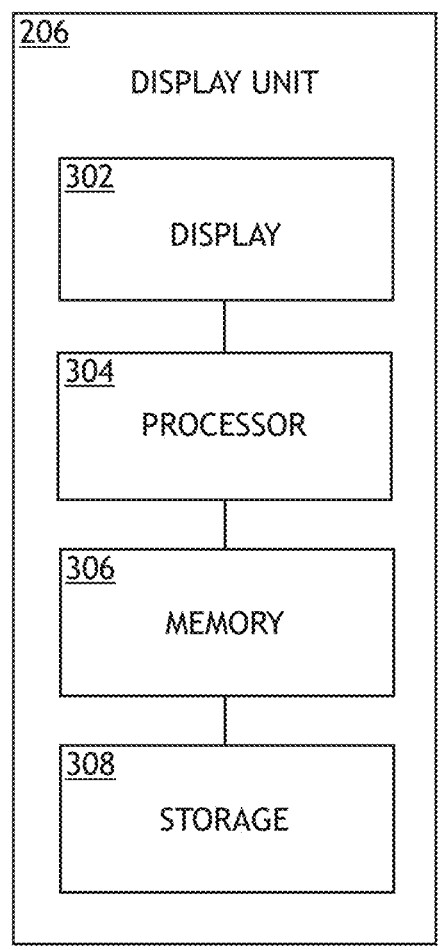
FIG. 3 is a view of an exemplary embodiment of the display unit computing device of FIG. 2 according to the inventive concepts disclosed herein.

The display unit computing device 206 may be implemented as any suitable computing device, such as a multi-function window (MFW) computing device, which may display views of maps, among other suitable things. As shown in FIG. 3, the display unit computing device 206 may include at least one display 302, at least one processor 304, at least one memory 306, and/or storage 308, some or all of which may be communicatively coupled at any given time. For example, the at least one processor 304 may include at least one general purpose processor (e.g., at least one central processing unit (CPU)), at least one digital signal processor (DSP), at least one application specific integrated circuit (ASIC), and/or at least one field-programmable gate array (FPGA). The processor 304 may be configured to run various software applications (e.g., a map window application) or computer code stored (e.g., maintained) in a non-transitory computer-readable medium (e.g., memory 306 and/or storage 308) and configured to execute various instructions or operations. The processor 304 may be configured to perform any or all of the operations disclosed throughout. For example, the processor 304 may be configured to: receive sensor data from the sensors 208; execute the map window application; receive data and views of maps; receive graphical alert content data (e.g., including information associated with at least one graphical alert); output the views of the maps to the display 302; and/or output the graphical alert content to the display 302. The display 302 may be configured to: present the views of the maps; and/or present at least one graphical alert on the display 302 to the user, wherein the graphical alert is associated with the location of the object or occurrence.

The sensors 208 may be any suitable sensors configured to output sensor data to another computing device (e.g., 206, 210A, 210B, 210C, 210D, 210E, 210F, 210G, and/or 210H). For example, the sensors 208 may include any or all of the following: at least one global positioning system (GPS) sensor 208-1; at least one inertial reference system (IRS) sensor; at least one IMU sensor; at least one throttle position sensor; at least one aircraft position sensor; at least one groundspeed sensor; and/or any other sensors commonly installed in aircraft. The sensors 208 may be configured to output sensor data (e.g., aircraft three-dimensional (3D) position and/or speed) to some or all of the computing devices (e.g., 206, 210A, 210B, 210C, 210D, 210E, 210F, 210G, and/or 210H) and/or the communications and/or surveillance and/or radar systems 212.

Figure 4:
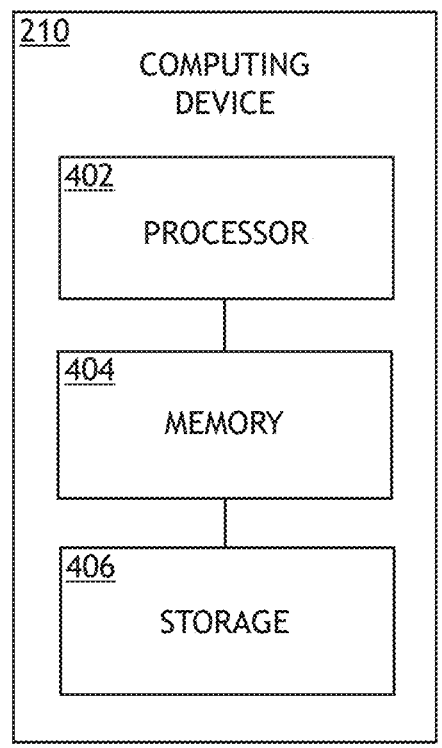
FIG. 4 is a view of an exemplary embodiment of a computing device of FIG. 2 according to the inventive concepts disclosed herein.

The computing device 210A may be implemented as any suitable computing device, such as an FMS computing device and/or a flight data computer. As shown in FIG. 4, the computing device 210A may include the elements of the computing device 210 and may include at least one processor 402, at least one memory 404, and/or at least one storage 406, some or all of which may be communicatively coupled at any given time. For example, the at least one processor 402 may include at least one general purpose processor (e.g., at least one central processing unit (CPU)), at least one digital signal processor (DSP), at least one application specific integrated circuit (ASIC), and/or at least one field-programmable gate array (FPGA). The processor 402 may be configured to run various software applications (e.g., an FMS application) or computer code stored (e.g., maintained) in a non-transitory computer-readable medium (e.g., memory 404 and/or storage 406) and configured to execute various instructions or operations. The processor 402 of the computing device 210A may be configured to perform any or all of the operations disclosed throughout.

For example, the processor 402 of the computing device 210A may be configured to: receive sensor data from the sensors 208; receive data from the communications and/or surveillance and/or radar systems 212; and/or perform FMS operations.

The computing device 210B may be implemented as any suitable computing device, such as a traffic computer. As shown in FIG. 4, the computing device 210B may include the elements of the computing device 210 and may include at least one processor 402, at least one memory 404, and/or at least one storage 406, some or all of which may be communicatively coupled at any given time. For example, the at least one processor 402 may include at least one general purpose processor (e.g., at least one central processing unit (CPU)), at least one digital signal processor (DSP), at least one application specific integrated circuit (ASIC), and/or at least one field-programmable gate array (FPGA). The processor 402 may be configured to run various software applications (e.g., an autopilot application) or computer code stored (e.g., maintained) in a non-transitory computer-readable medium (e.g., memory 404 and/or storage 406) and configured to execute various instructions or operations. The processor 402 of the computing device 210B may be configured to perform any or all of the operations disclosed throughout. For example, the processor 402 of the computing device 210B may be configured to: monitor a location of the aircraft 102A relative to other objects (e.g., vehicle 104A or other obstacles) or occurrences (e.g., weather occurrence 106A); with respect to the performance of other listed operations, receive and use data from the airport database computing device (e.g., 210C), the communications and/or surveillance and/or radar systems 212 (e.g., the weather radar system 706 for weather occurrences 106A and/or the ADS-B and/or ADS-C transceivers 702, 704 for air traffic data), the GPS sensor 208-1 for a position of the aircraft 102A, and/or the at least one head and/or pose tracking system computing device (e.g., 210D) to determine a position of an array 220 of haptic devices 216 relative to a body of the aircraft 102A; identify, determine, and/or detect an object or occurrence, a priority of the objector or occurrence, a distance from the aircraft 102A to the objector or occurrence, and/or an angle between the aircraft 102A and the object or occurrence; assign a priority level to the object or occurrence; determine a location of an object or occurrence relative to the user and/or the array 220 of haptic devices 216; based at least on the location of the object or occurrence relative to the user 202 and/or the array 220 of haptic devices 216, select at least one haptic device 216 of the array 220 of haptic devices 216 to be driven and function as a directional haptic alert to the user 202, wherein the directional haptic alert is indicative of a direction from the user 202 and/or the selected at least one haptic device 216 toward the object or occurrence; output at least one command to cause a driving of the selected at least one haptic device 216, wherein the driving of the selected at least one haptic device 216 is perceivable by the user 202 as the directional haptic alert; assign a priority level of at least two priority levels for the directional haptic alert, the assigned priority level being one of relatively lower or higher than another priority level of the at least two priority levels; based at least on the assigned priority level, output the at least one command to cause the driving of the selected at least one haptic device 216, wherein the driving of the selected at least one haptic device 216 is perceivable by the user as the directional haptic alert, wherein an intensity of the driving of the selected at least one haptic device is correlated with the assigned priority level; based at least on the assigned priority level and the location of the object or occurrence relative to the user 202 and/or the array 220 of haptic devices 216, select at least one haptic device 216 of the array 220 of haptic devices 216 to be driven and function as a directional haptic alert to the user, wherein the directional haptic alert is indicative of the direction from the user 202 and/or the selected at least one haptic device 216 toward the object or occurrence, wherein a quantity of the selected at least one haptic device 216 is correlated with the assigned priority level; based at least on position and orientation data (e.g., received from the head and/or pose tracking system computing device 210D) associated with a position and an orientation of at least one portion (e.g., a head) of the user 202 relative to the aircraft 102A and the location of the object or occurrence relative to the aircraft 102A, determine the location of an object or occurrence relative to the user 202 and/or the array 220 of haptic devices 216; based at least on the location of the object or occurrence relative to the user 202 and/or a first array 220 of haptic devices 216 and a second array 220 of haptic devices 216, select at least one haptic device 216 of each of the first array 220 and the second array 220 to be driven and function as the directional haptic alert to the user 202, wherein the directional haptic alert is indicative of the direction from the user and/or the selected at least one haptic device 216 toward the object or occurrence; output at least one additional command to issue a three-dimensional (3D) directional audio alert to the user 202, wherein the 3D directional audio alert is directionally aligned with the directional haptic alert; output at least one further command to present a graphical alert on the display 302 to the user 202, wherein the graphical alert is associated with the location of the object or occurrence; and/or output at least one supplementary command to cause a driving of at least one haptic device 216 of the sidestick 214, wherein the driving of the at least one haptic device 216 is perceivable by the user as a supplementary haptic alert.

The computing device 210C may be implemented as any suitable computing device, such as an airport database computing device. As shown in FIG. 4, the computing device 210C may include the elements of the computing device 210 and may include at least one processor 402, at least one memory 404, and/or at least one storage 406, some or all of which may be communicatively coupled at any given time. For example, the at least one processor 402 may include at least one general purpose processor (e.g., at least one central processing unit (CPU)), at least one digital signal processor (DSP), at least one application specific integrated circuit (ASIC), and/or at least one field-programmable gate array (FPGA). The processor 402 may be configured to run various software applications (e.g., a database application) or computer code stored (e.g., maintained) in a non-transitory computer-readable medium (e.g., memory 404 and/or storage 406) and configured to execute various instructions or operations. The processor 402 of the computing device 210C may be configured to perform any or all of the operations disclosed throughout. For example, the processor 402 of the computing device 210C may be configured to store and output data associated with airport surfaces and airport obstacles for one or more airports.

Figure 6:
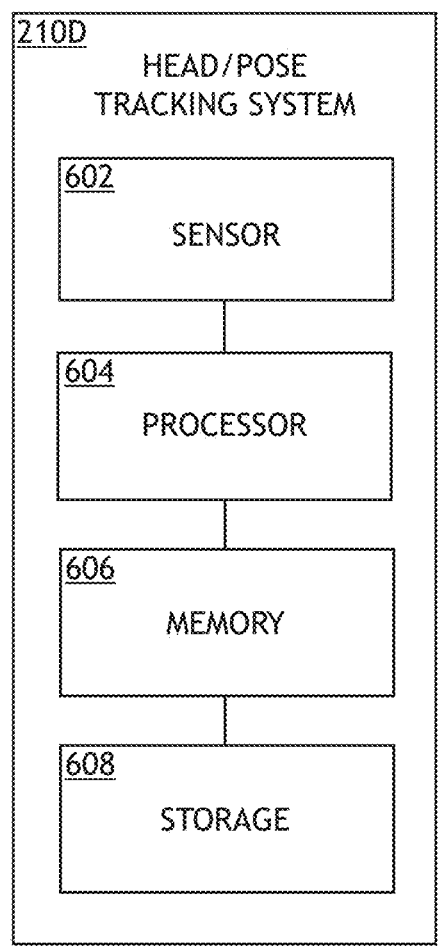
FIG. 6 is a view of an exemplary embodiment of a head and/or pose tracking system computing device of FIG. 2 according to the inventive concepts disclosed herein.
Figure 7:
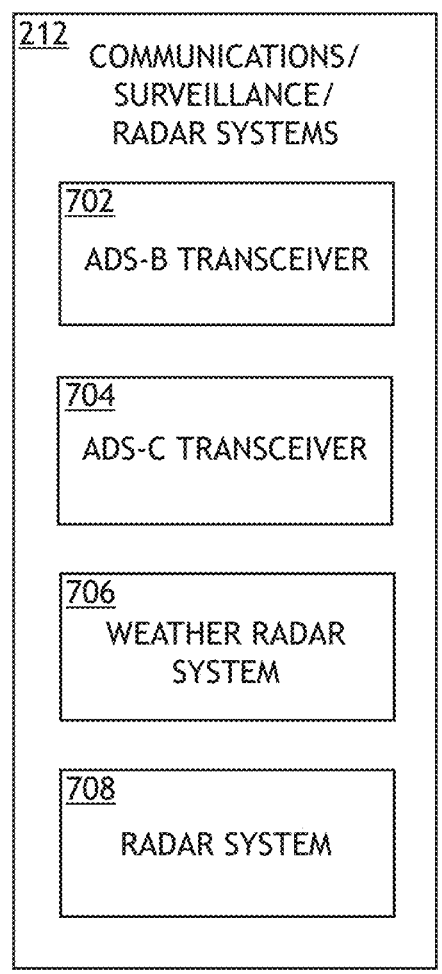
FIG. 7 is a view of an exemplary embodiment of a communications and/or surveillance and/or radar system of FIG. 2 according to the inventive concepts disclosed herein.
Figure 8:
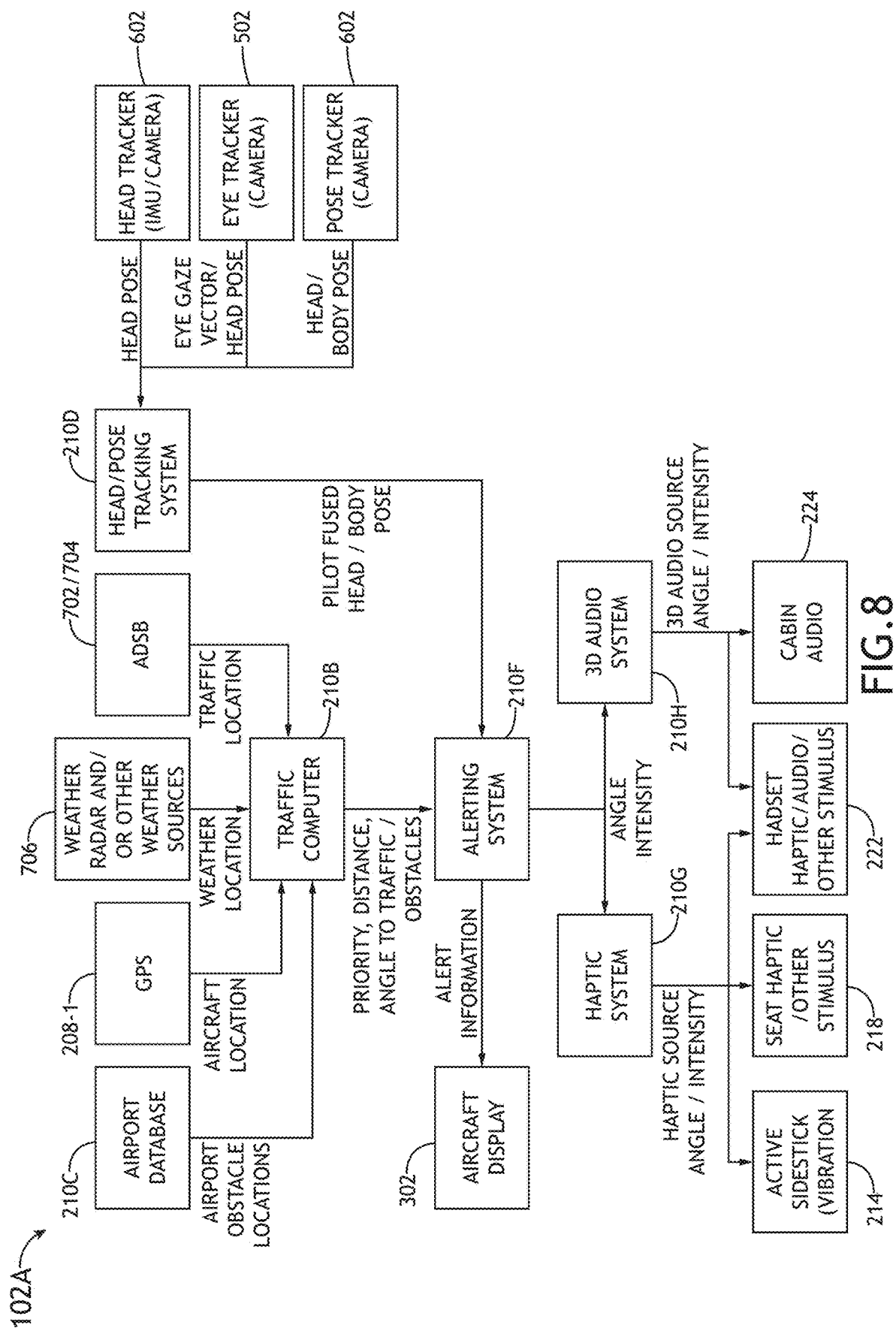
FIG. 8 is a further view of the aircraft of FIG. 2 according to the inventive concepts disclosed herein.

The computing device 210D may be implemented as any suitable computing device, such as a head and/or pose tracking system computing device. As shown in FIG. 6, the computing device 210D may include sensors 602, at least one processor 604, at least one memory 606, and/or at least one storage 606, some or all of which may be communicatively coupled at any given time. For example, the at least one processor 604 may include at least one general purpose processor (e.g., at least one central processing unit (CPU)), at least one digital signal processor (DSP), at least one application specific integrated circuit (ASIC), and/or at least one field-programmable gate array (FPGA). The processor 604 may be configured to run various software applications (e.g., a head and/or pose tracking application) or computer code stored (e.g., maintained) in a non-transitory computer-readable medium (e.g., memory 606 and/or storage 606) and configured to execute various instructions or operations. The processor 604 of the computing device 210D may be configured to perform any or all of the operations disclosed throughout. For example, the processor 604 of the computing device 210D may be configured to: collect tracking data from various cameras and/or various user tracking systems, such as the head and/or pose tracking system (e.g., 210D) and/or any eye tracking system (e.g., 210E); fuse the tracking data together to determine the user's 202 head and/or body poses; determine a position and an orientation of at least one portion (e.g., the head) of the user 202 relative to the aircraft 102A; and/or output (e.g., to another computing device 210 (e.g., 210B) of the aircraft 102A) position and orientation data associated with the position and the orientation of the at least one portion of the user relative to the vehicle.

Figure 5:
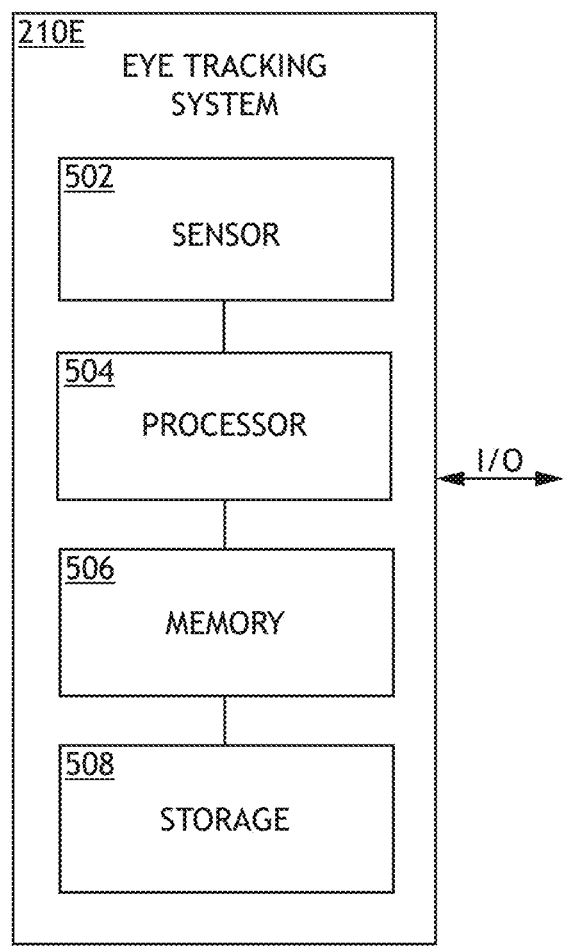
FIG. 5 is a view of an exemplary embodiment of an eye tracking system computing device of FIG. 2 according to the inventive concepts disclosed herein.

The computing device 210E may be implemented as any suitable computing device, such as an eye tracking system computing device. As shown in FIG. 5, the computing device 210E may include at least one sensor 502, at least one processor 504, at least one memory 506, and/or at least one storage 506, some or all of which may be communicatively coupled at any given time. For example, the at least one processor 504 may include at least one general purpose processor (e.g., at least one central processing unit (CPU)), at least one digital signal processor (DSP), at least one application specific integrated circuit (ASIC), and/or at least one field-programmable gate array (FPGA). The processor 504 may be configured to run various software applications (e.g., an eye tracking system application) or computer code stored (e.g., maintained) in a non-transitory computer-readable medium (e.g., memory 506 and/or storage 508) and configured to execute various instructions or operations. The processor 504 of the computing device 210E may be configured to perform any or all of the operations disclosed throughout. For example, the processor 504 of the computing device 210E may be configured to: perform eye tracking system operations to determine a position, orientation, and/or gaze of the user 202; output (e.g., to another computing device 210 (e.g., 210D)) eye tracking data associated with the determined position, orientation, and/or gaze of the user 202.

The computing device 210F may be implemented as any suitable computing device, such as an alerting system computing device. As shown in FIG. 4, the computing device 210F may include the elements of the computing device 210 and may include at least one processor 402, at least one memory 404, and/or at least one storage 406, some or all of which may be communicatively coupled at any given time. For example, the at least one processor 402 may include at least one general purpose processor (e.g., at least one central processing unit (CPU)), at least one digital signal processor (DSP), at least one application specific integrated circuit (ASIC), and/or at least one field-programmable gate array (FPGA). The processor 402 may be configured to run various software applications (e.g., an alerting system application) or computer code stored (e.g., maintained) in a non-transitory computer-readable medium (e.g., memory 404 and/or storage 406) and configured to execute various instructions or operations. The processor 402 of the computing device 210F may be configured to perform any or all of the operations disclosed throughout. For example, the processor 402 of the computing device 210F may be configured to: receive potential objects or occurrences from the traffic computer (e.g., 210B); use position and orientation data associated with the position and the orientation of the at least one portion (e.g., a head) of the user 202 relative to the vehicle to generate two angles (e.g., a first angle corresponding to a direction between the object or occurrence in relation the at least one portion (e.g., a head) of the user 202, and a second angle corresponding to a direction to the object or occurrence relative to a body of the aircraft 102A); use a priority of and/or a context of the aircraft 102A's circumstances in relation to the object or occurrence to determine a priority level for an alert (e.g., directional haptic alert); output information including the two angles and any priority level associated with the alert to the haptic system computing device (e.g., 210G) and/or the 3D audio system computing device (e.g., 210H); receive at least one command from the traffic computer (e.g., 210B) to issue at least one alert (e.g., a directional haptic alert, a directional 3D audio alert, and/or a graphical alert) and/or cause such alert(s) to be performed; determine a location of an object or occurrence relative to the user 202 and/or the array 220 of haptic devices 216; based at least on the location of the object or occurrence relative to the user 202 and/or the array 220 of haptic devices 216, select at least one haptic device 216 of the array 220 of haptic devices 216 to be driven and function as a directional haptic alert to the user 202, wherein the directional haptic alert is indicative of a direction from the user 202 and/or the selected at least one haptic device 216 toward the object or occurrence; output at least one command to cause a driving of the selected at least one haptic device 216, wherein the driving of the selected at least one haptic device 216 is perceivable by the user 202 as the directional haptic alert; assign a priority level of at least two priority levels for the directional haptic alert, the assigned priority level being one of relatively lower or higher than another priority level of the at least two priority levels; based at least on the assigned priority level, output the at least one command to cause the driving of the selected at least one haptic device 216, wherein the driving of the selected at least one haptic device 216 is perceivable by the user as the directional haptic alert, wherein an intensity of the driving of the selected at least one haptic device is correlated with the assigned priority level; based at least on the assigned priority level and the location of the object or occurrence relative to the user and/or the array 220 of haptic devices 216, select at least one haptic device 216 of the array 220 of haptic devices 216 to be driven and function as a directional haptic alert to the user, wherein the directional haptic alert is indicative of the direction from the user and/or the selected at least one haptic device 216 toward the object or occurrence, wherein a quantity of the selected at least one haptic device 216 is correlated with the assigned priority level; based at least on position and orientation data (e.g., received from the head and/or pose tracking system computing device 210D) associated with a position and an orientation of at least one portion (e.g., a head) of the user 202 relative to the aircraft 102A and the location of the object or occurrence relative to the aircraft 102A, determine the location of an object or occurrence relative to the array 220 of haptic devices 216; based at least on the location of the object or occurrence relative to the user 202 and/or a first array 220 of haptic devices 216 and a second array 220 of haptic devices 216, select at least one haptic device 216 of each of the first array 220 and the second array 220 to be driven and function as the directional haptic alert to the user 202, wherein the directional haptic alert is indicative of the direction from the user and/or the selected at least one haptic device 216 toward the object or occurrence; output at least one additional command to issue a three-dimensional (3D) directional audio alert to the user 202, wherein the 3D directional audio alert is directionally aligned with the directional haptic alert, wherein the 3D directional audio alert produces a sound effect which is perceived by the user 202 as coming from the direction of the object or occurrence; output at least one further command to present a graphical alert on the display 302 to the user 202, wherein the graphical alert is associated with the location of the object or occurrence; and/or output at least one supplementary command to cause a driving of at least one haptic device 216 of the sidestick 214, wherein the driving of the haptic device 216 is perceivable by the user as a supplementary haptic alert.

The computing device 210G may be implemented as any suitable computing device, such as a haptic system computing device. As shown in FIG. 4, the computing device 210G may include the elements of the computing device 210 and may include at least one processor 402, at least one memory 404, and/or at least one storage 406, some or all of which may be communicatively coupled at any given time. For example, the at least one processor 402 may include at least one general purpose processor (e.g., at least one central processing unit (CPU)), at least one digital signal processor (DSP), at least one application specific integrated circuit (ASIC), and/or at least one field-programmable gate array (FPGA). The processor 402 may be configured to run various software applications (e.g., a haptic system application) or computer code stored (e.g., maintained) in a non-transitory computer-readable medium (e.g., memory 404 and/or storage 406) and configured to execute various instructions or operations. The processor 402 of the computing device 210G may be configured to perform any or all of the operations disclosed throughout. For example, the processor 402 of the computing device 210G may be configured to: receive at least one command from the traffic computer (e.g., 210B) and/or the alerting system computing device (e.g., 210F) to issue a haptic alert (e.g., a directional haptic alert), cause such alert(s) to be performed, and/or drive selected haptic device(s) 216 at instructed intensities, frequencies, and/or with instructed pulsing patterns.

The computing device 210H may be implemented as any suitable computing device, such as an audio system computing device (e.g., a 3D audio system computing device). As shown in FIG. 4, the computing device 210H may include the elements of the computing device 210 and may include at least one processor 402, at least one memory 404, and/or at least one storage 406, some or all of which may be communicatively coupled at any given time. For example, the at least one processor 402 may include at least one general purpose processor (e.g., at least one central processing unit (CPU)), at least one digital signal processor (DSP), at least one application specific integrated circuit (ASIC), and/or at least one field-programmable gate array (FPGA). The processor 402 may be configured to run various software applications (e.g., a 3D audio system application) or computer code stored (e.g., maintained) in a non-transitory computer-readable medium (e.g., memory 404 and/or storage 406) and configured to execute various instructions or operations. The processor 402 of the computing device 210H may be configured to perform any or all of the operations disclosed throughout. For example, the processor 402 of the computing device 210H may be configured to: receive at least one command from the traffic computer (e.g., 210B) and/or the alerting system computing device (e.g., 210F) to issue a 3D audio alert (e.g., a directional 3D audio alert), cause such alert(s) to be performed, and/or drive selected speakers 224 and/or speakers of the head wearable device 222 at instructed intensities, at instructed tone(s), and/or with instructed tonal patterns. In some embodiments, the directional 3D audio alert may be a 3D audio message, created using text-to-speech, which may provides the direction of the object or occurrence and altitude.

The communications and/or surveillance and/or radar systems 212 may be any suitable communications and/or surveillance and/or radar equipment configured to transmit and/or receive signals (e.g., radar signals (e.g., weather radar signals)) and/or communications (e.g., data and/or voice) (a) to and/or from at least one other aircraft (e.g., 104A), (b) to and/or from at least one ATC, (c) to and/or from another offboard site (e.g., a remote pilot ground station), and/or (d) to and/or from at least one object or occurrence (e.g., a weather occurrence 106A). For example, the communications and/or surveillance and/or radar systems 212 may include any or all of the following: at least one automatic dependent surveillance-broadcast (ADS-B) transceiver 702 (e.g., at least one ADS-B transmitter and/or at least one ADS-B receiver); at least one ADS-Contract (ADS-C) transceiver 704 (e.g., at least one ADS-C transmitter and/or at least one ADS-C receiver); at least one weather radar system 706; at least one radar system 708; at least one radio (not shown); and/or any other communications and/or surveillance and/or radar equipment commonly installed in an aircraft (e.g., 102A, 104A).

Referring still to FIGS. 2-8, for example, at least one processor (e.g., the at least one processor 304, the at least one processor 402 of the computing device 210A, the at least one processor 402 of the computing device 210B, the at least one processor 402 of the computing device 210C, the at least one processor 504 of the computing device 210E, the at least one processor 604 of the computing device 210D, the at least one processor 402 of the computing device 210F, the at least one processor 402 of the computing device 210G, and/or the at least one processor 402 of the computing device 210H may be configured to perform (e.g., collectively perform, if more than one processor) any or all of the operations disclosed throughout.

Referring now to FIGS. 13A, 13B, 13C, and 13D, an exemplary embodiment is shown. For example, a first array 220 of haptic sensors 216 may be installed in or on the seat bottom cushion 1202 and a second array 220 may be installed in or the helmet 222B. Actively driven haptic devices 216A are shown. For example, as the user 202 changes a position and/or orientation of the user's 202 head, the actively driven haptic devices 216A of the helmet 222B change to maintain a directional alignment with the object or occurrence while the actively driven haptic devices 216A of the seat 218 remain the same.

Still referring to FIGS. 13A, 13B, 13C, and 13D, for example, a traffic computer (e.g., 210B) may detect an object or occurrence (e.g., a threat) from another aircraft 104A at the pilot's 2 O'clock. The traffic computer (e.g., 210B) may send a high priority level threat and an angle toward the threat to the alerting system (e.g., 210F). The alerting system may receive pose information from the head and/or pose tracking system (e.g., 210D) indicating that the pilot is looking straight ahead. The alerting system may further send a message to aircraft display (e.g., 302) to show a graphical alert on the display 302 with an arrow pointing in the direction of the threat. The alerting system may further send an angle relative to the aircraft 102, an angle relative to the helmet 222B, and a high intensity instruction to the haptic system processor (e.g., 402 of computing device 210G) and the 3D audio system processor (e.g., 402 of computing device 210H). The haptic system processor may: send a haptic/vibration signal to the sidestick to indicate a warning, sends a haptic signal to the seat 218 to vibrate the motors of haptic devices 216 closest to the 2 o'clock direction, and/or send a haptic signal to the headset 222A and/or helmet 222B to vibrate the motors of haptic devices closest to the 2 o'clock direction. The 3D audio system processor may: create a 3D audio message using text-to-speech which provides the direction of the threat and altitude; sends a 3D audio alert to the headset 222A which the pilot perceives coming from the 2 o'clock direction; sends a 3D audio alert through the cabin speakers (e.g., 224) which the pilot perceives coming from the 2 o'clock direction.

Referring now to FIG. 14, an exemplary embodiment of a method 1400 according to the inventive concepts disclosed herein may include one or more of the following steps. Additionally, for example, some embodiments may include performing one or more instances of the method 1400 iteratively, concurrently, and/or sequentially. Additionally, for example, at least some of the steps of the method 1000 may be performed in parallel and/or concurrently. Additionally, in some embodiments, at least some of the steps of the method 1400 may be performed non-sequentially.

A step 1402 may include determining, by at least one processor of a vehicle, a location of an object or occurrence relative to a user and/or an array of haptic devices, the vehicle including the at least one processor and the array of haptic devices, wherein a driving of one or more haptic devices of the array of haptic devices is perceivable by the user as at least one of a tactile or a vibratory sensation, the at least one processor communicatively coupled to the array of haptic devices.

A step 1404 may include based at least on the location of the object or occurrence relative to the user and/or the array of haptic devices, selecting, by the at least one processor, at least one haptic device of the array of haptic devices to be driven and function as a directional haptic alert to the user, wherein the directional haptic alert is indicative of a direction from the user and/or the selected at least one haptic device toward the object or occurrence.

A step 1406 may include outputting, by the at least one processor, at least one command to cause a driving of the selected at least one haptic device, wherein the driving of the selected at least one haptic device is perceivable by the user as the directional haptic alert.

Further, the method 1400 may include any of the operations disclosed throughout.

As will be appreciated from the above, embodiments of the inventive concepts disclosed herein may be directed to a method and a system (e.g., a vehicular system) including array of haptic devices and at least one processor, wherein the system may be configured to output at least one command to cause a driving of a selected portion of the array of haptic devices, wherein the driving of the selected portion is perceivable by the user as a directional haptic alert associated with a location of an object or occurrence relative to the user and/or the array of haptic devices.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a vehicle, comprising:
an array of haptic devices, wherein a driving of one or more haptic devices of the array of haptic devices is perceivable by a user as at least one of a tactile or a vibratory sensation; and
at least one processor communicatively coupled to the array of haptic devices, the at least one processor configured to:
determine a location of an object or occurrence relative to the user;
based at least on the location of the object or occurrence relative to the user, select at least one haptic device of the array of haptic devices to be driven and function as a directional haptic alert to the user, wherein the directional haptic alert is indicative of a direction from the user toward the object or occurrence; and
output at least one command to cause a driving of the selected at least one haptic device, wherein the driving of the selected at least one haptic device is perceivable by the user as the directional haptic alert;
wherein the at least one processor is further configured to:
assign a priority level of at least two priority levels for the directional haptic alert, the assigned priority level being one of relatively lower or higher than another priority level of the at least two priority levels; and
based at least on the assigned priority level, output the at least one command to cause the driving of the selected at least one haptic device, wherein the driving of the selected at least one haptic device is perceivable by the user as the directional haptic alert, wherein an intensity of the driving of the selected at least one haptic device is correlated with the assigned priority level.

2. The system of claim 1, wherein each haptic device of the array of haptic devices includes a motor or an ultrasonic transducer.

3. The system of claim 1, wherein the vehicle is an aircraft.

4. The system of claim 1, wherein the object or occurrence is another vehicle.

5. The system of claim 1, wherein the object or occurrence is a weather occurrence.

6. The system of claim 1, wherein the at least one processor is further configured to: based at least on the assigned priority level and the location of the object or occurrence relative to the user, select at least one haptic device of the array of haptic devices to be driven and function as a directional haptic alert to the user, wherein the directional haptic alert is indicative of the direction from the user toward the object or occurrence, wherein a quantity of the selected at least one haptic device is correlated with the assigned priority level.

7. The system of claim 1, wherein the vehicle further comprises a seat, wherein the array of haptic devices is installed in or on the seat.

8. The system of claim 1, further comprising a head wearable device wearable by the user within the vehicle, wherein the array of haptic devices is installed in or on the head wearable device, wherein the head wearable device is one of a helmet or a headset.

9. The system of claim 6, wherein the vehicle further comprises a head and/or pose tracking system communicatively coupled to the at least one processor, wherein the head and/or pose tracking system is configured to: output position and orientation data associated with a position and an orientation of at least one portion of the user relative to the vehicle; wherein the at least one processor is further configured to: based at least on the position and orientation data and the location of the object or occurrence relative to the vehicle, determine the location of an object or occurrence relative to the array of haptic devices.

10. The system of claim 6, wherein the vehicle further comprises a seat and a second array of haptic devices, wherein the second array of haptic devices is installed in or on the seat, wherein the at least one processor is further configured to: based at least on the location of the object or occurrence relative to the user, select at least one haptic device of each of the array and the second array to be driven and function as the directional haptic alert to the user, wherein the directional haptic alert is indicative of the direction from the user toward the object or occurrence.

11. The system of claim 1, wherein the at least one processor is further configured to: output at least one additional command to issue a three-dimensional (3D) directional audio alert to the user, wherein the 3D directional audio alert is directionally aligned with the directional haptic alert.

12. The system of claim 11, wherein the vehicle further comprises a display and a sidestick, the sidestick including a haptic device in or on the sidestick, wherein the at least one processor is further configured to: output at least one further command to present a graphical alert on the display to the user, wherein the graphical alert is associated with the location of the object or occurrence; wherein the at least one processor is further configured to: output at least one supplementary command to cause a driving of the haptic device of the sidestick, wherein the driving of the haptic device is perceivable by the user as a supplementary haptic alert.

13. A method, comprising:
  determining, by at least one processor of a vehicle, a location of an object or occurrence relative to a user, the vehicle including the at least one processor and an array of haptic devices, wherein a driving of one or more haptic devices of the array of haptic devices is perceivable by the user as at least one of a tactile or a vibratory sensation, the at least one processor communicatively coupled to the array of haptic devices;
  based at least on the location of the object or occurrence relative to the user, selecting, by the at least one processor, at least one haptic device of the array of haptic devices to be driven and function as a directional haptic alert to the user, wherein the directional haptic alert is indicative of a direction from the user toward the object or occurrence; and
  outputting, by the at least one processor, at least one command to cause a driving of the selected at least one haptic device, wherein the driving of the selected at least one haptic device is perceivable by the user as the directional haptic alert;
  wherein the at least one processor is further configured to:
    assign a priority level of at least two priority levels for the directional haptic alert, the assigned priority level being one of relatively lower or higher than another priority level of the at least two priority levels; and
    based at least on the assigned priority level, output the at least one command to cause the driving of the selected at least one haptic device, wherein the driving of the selected at least one haptic device is perceivable by the user as the directional haptic alert, wherein an intensity of the driving of the selected at least one haptic device is correlated with the assigned priority level.

14. A system, comprising:
  a vehicle, comprising:
    an array of haptic devices, wherein a driving of one or more haptic devices of the array of haptic devices is perceivable by a user as at least one of a tactile or a vibratory sensation; and
    at least one processor communicatively coupled to the array of haptic devices, the at least one processor configured to:
      determine a location of an object or occurrence relative to the user;
      based at least on the location of the object or occurrence relative to the user, select at least one haptic device of the array of haptic devices to be driven and function as a directional haptic alert to the user, wherein the directional haptic alert is indicative of a direction from the user toward the object or occurrence; and
      output at least one command to cause a driving of the selected at least one haptic device, wherein the driving of the selected at least one haptic device is perceivable by the user as the directional haptic alert;
    wherein the at least one processor is further configured to:
      assign a priority level of at least two priority levels for the directional haptic alert, the assigned priority level being one of relatively lower or higher than another priority level of the at least two priority levels; and
      based at least on the assigned priority level and the location of the object or occurrence relative to the user, select at least one haptic device of the array of haptic devices to be driven and function as a directional haptic alert to the user, wherein the directional haptic alert is indicative of the direction from the user toward the object or occurrence, wherein a quantity of the selected at least one haptic device is correlated with the assigned priority level.

15. The system of claim 14, wherein each haptic device of the array of haptic devices includes a motor or an ultrasonic transducer.

16. A system, comprising:
  a vehicle, comprising:
    an array of haptic devices, wherein a driving of one or more haptic devices of the array of haptic devices is perceivable by a user as at least one of a tactile or a vibratory sensation;

at least one processor communicatively coupled to the array of haptic devices, the at least one processor configured to:
  determine a location of an object or occurrence relative to the user;
  based at least on the location of the object or occurrence relative to the user, select at least one haptic device of the array of haptic devices to be driven and function as a directional haptic alert to the user, wherein the directional haptic alert is indicative of a direction from the user toward the object or occurrence; and
  output at least one command to cause a driving of the selected at least one haptic device, wherein the driving of the selected at least one haptic device is perceivable by the user as the directional haptic alert;
a head wearable device wearable by the user within the vehicle, wherein the array of haptic devices is installed in or on the head wearable device, wherein the head wearable device is one of a helmet or a headset; and
a head and/or pose tracking system communicatively coupled to the at least one processor, wherein the head and/or pose tracking system is configured to: output position and orientation data associated with a position and an orientation of at least one portion of the user relative to the vehicle;
wherein the at least one processor is further configured to: based at least on the position and orientation data and the location of the object or occurrence relative to the vehicle, determine the location of an object or occurrence relative to the array of haptic devices.

17. The system of claim 16, wherein each haptic device of the array of haptic devices includes a motor or an ultrasonic transducer.

18. A system, comprising:
a vehicle, comprising:
  an array of haptic devices, wherein a driving of one or more haptic devices of the array of haptic devices is perceivable by a user as at least one of a tactile or a vibratory sensation;
  at least one processor communicatively coupled to the array of haptic devices, the at least one processor configured to:
    determine a location of an object or occurrence relative to the user;
    based at least on the location of the object or occurrence relative to the user, select at least one haptic device of the array of haptic devices to be driven and function as a directional haptic alert to the user, wherein the directional haptic alert is indicative of a direction from the user toward the object or occurrence; and
    output at least one command to cause a driving of the selected at least one haptic device, wherein the driving of the selected at least one haptic device is perceivable by the user as the directional haptic alert;
  a head wearable device wearable by the user within the vehicle, wherein the array of haptic devices is installed in or on the head wearable device, wherein the head wearable device is one of a helmet or a headset;
  a seat; and
  a second array of haptic devices, wherein the second array of haptic devices is installed in or on the seat;
  wherein the at least one processor is further configured to: based at least on the location of the object or occurrence relative to the user, select at least one haptic device of each of the array and the second array to be driven and function as the directional haptic alert to the user, wherein the directional haptic alert is indicative of the direction from the user toward the object or occurrence.

19. The system of claim 18, wherein each haptic device of the array of haptic devices includes a motor or an ultrasonic transducer.

20. The system of claim 19, wherein each haptic device of the second array of haptic devices includes a motor or an ultrasonic transducer.

* * * * *